(12) United States Patent
Chang et al.

(10) Patent No.: US 10,079,886 B2
(45) Date of Patent: Sep. 18, 2018

(54) MOBILE ACCESSING PRIVATE DATA ON CLOUD

(71) Applicant: SPATIAL DIGITAL SYSTEMS, INC., Agoura Hills, CA (US)

(72) Inventors: Donald C. D. Chang, Thousand Oaks, CA (US); Juo-Yu Lee, Camarillo, CA (US); Steve K. Chen, Pacific Palisades, CA (US)

(73) Assignee: SPATIAL DIGITAL SYSTEMS, INC., Agoura Hills, CA (US)

( * ) Notice: Subject to any disclaimer, the term of this patent is extended or adjusted under 35 U.S.C. 154(b) by 118 days.

(21) Appl. No.: 14/935,312

(22) Filed: Nov. 6, 2015

(65) Prior Publication Data

US 2017/0134493 A1    May 11, 2017

Related U.S. Application Data

(60) Provisional application No. 62/207,032, filed on Aug. 19, 2015.

(51) Int. Cl.
*H04L 29/06* (2006.01)
*H04L 29/08* (2006.01)
*G06F 17/30* (2006.01)

(52) U.S. Cl.
CPC .... *H04L 67/1097* (2013.01); *G06F 17/30516* (2013.01); *H04L 67/06* (2013.01)

(58) Field of Classification Search
CPC .......................... H04L 65/4084; H04L 65/602
USPC ......................................................... 709/206
See application file for complete search history.

(56) References Cited

U.S. PATENT DOCUMENTS

2010/0332401 A1* 12/2010 Prahlad ............. G06F 17/30082
                                                             705/80
2012/0319885 A1* 12/2012 Chang .................. H03F 1/0277
                                                             341/155

* cited by examiner

*Primary Examiner* — Adnan Mirza
(74) *Attorney, Agent, or Firm* — Phuong-Quan Hoang

(57) ABSTRACT

Presented are cloud storage architectures for private data among terminals with enhanced capability of data privacy and survivability. Pre-processing for storing data in IP cloud comprises: transforming multiple first data sets into multiple second data sets at an uploading site, wherein one of said second data sets comprises a weighted sum of said first data sets; storing said second data sets in an IP cloud via IP connectivity; and storing multiple data storages linking to said second data sets at said uploading site. In accordance with an embodiment post processing may comprise recovering said second data sets at a downloading site via IP network.

20 Claims, 29 Drawing Sheets

K-Muxing/Demuxing in a mobile device
*Data in distributed cloud storage with a 3 for 4 redundancy*

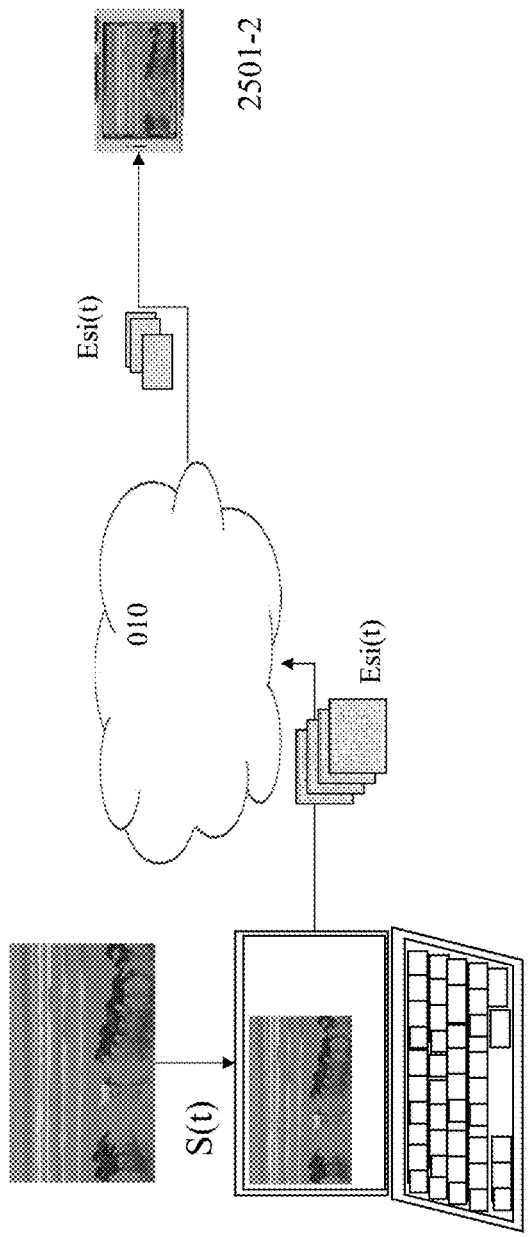

K-Muxing/Demuxing in a mobile device
*Data in distributed cloud storage with a 2 for 4 redundancy*

MOBILE ACCESSING PRIVATE DATA ON CLOUD

RELATED APPLICATIONS

This application claims priority to U.S. provisional application No. 62,207,032 filed on Aug. 19, 2015, which is incorporated herein by reference in its entirety. This application is also related to
1. U.S. Pat. No. 8,111,646; "Communication System For Dynamically Combining Power From A Plurality Of Propagation Channels In Order To Improve Power Levels Of Transmitted Signals Without Affecting Receiver And Propagation Segment," Issued on Feb. 7, 2012.
2. U.S. Pat. No. 8,098,612; "Apparatus And The Method For Remote Beam Forming For Satellite Broadcasting Systems," Issued on Jan. 17, 2012.
3. U.S. Pat. Appl. Pub. No.20110197740; "Novel Karaoke and Multi-Channel Data Recording/Transmission Techniques via Wavefront Multiplexing and Demultiplexing," published on Aug. 18, 2011.
4. U.S. Pat. Appl. Pub. No. 20140081989; "Wavefront Muxing and Demuxing for Cloud Data Storage and Transport," published on Mar. 20, 2014.

All of the above are incorporated herein by reference in their entireties.

FIELD OF THE DISCLOSURE

An article "Erasure coding vs Raid as a data protection method" was published in April 2014 on COMPUTERWEEKLY.COM by Manek Dubash. He started the article as follows; "With hard disk drive (HDD) capacities edging upwards—6TB HDDs are now available—Raid is becoming increasingly problematic as a method of data protection against hardware failure. As a response, erasure coding as an alternative to backup has emerged as a method of protecting against drive failure." His views on Raid are as followed;
Raid just does not cut it in the age of high-capacity HDDs. The larger a disk's capacity, the greater the chance of bit error. And when a disk fails, the Raid rebuild process begins, during which there is no protection against a second (or third) mechanism failure. So not only has the risk of failure during normal operation grown with capacity, it is much higher during Raid rebuild, too. Also, rebuild times were once measured in minutes or hours, but disk transfer rates have not kept pace with the rate of disk capacity expansion, so large Raid rebuilds can now take days or even longer.

Mr. Dubash continued and stated that "Consequently, many argue that alternatives to Raid are now needed, and one alternative is erasure coding."

This invention addresses similar issues of protecting data using a different technique called wavefront multiplexing (WF muxing) and wavefront demultiplexing (WF demuxing). The WF muxing/demuxing technology was originated from smart antenna methodology and wave propagation theory for satellite communications applications and has been documented in the first and the second references in the above US patent and patent application list. WF muxing/demuxing, embodying an architecture that utilizes multi-dimensional transmissions, has found applications in fields beyond the satellite communication domain. One such application is data storage and transport as disclosed in the third reference.

BACKGROUND

Security on data storage and transport are important concerns on cloud computing. Wavefront multiplexing/demultiplexing (WF muxing/demuxing) process embodies an architecture that utilizes multi-dimensional waveforms in cloud data storage and transport. Multiple data sets are preprocessed by WF muxing before stored/transported. WF muxed data is aggregated data from multiple data sets that have been "customized processed" and disassembled into any scalable number of sets of processed data, with each set being stored on a storage site. The original data is reassembled via WF demuxing after retrieving a lesser but scalable number of WF muxed data sets. In short, the WF muxed data storage solution enhances data security and data redundancy by, respectively, creating a new dimension to existing security/privacy methods and significantly reducing the storage space needed for data redundancy. In addition, WF muxing/demuxing methods enable a monitoring capability on the integrity of stored data.

K-space is also a well understood term in solid state physics and Imaging processing. The k-space can refer to:
1. Another name for the frequency domain but referring to a spatial rather than temporal frequency
2. Reciprocal space for the Fourier transform of a spatial function
3. Momentum space for the vector space of possible values of momentum for a particle
4. The k-space in magnetic resonance imaging (MRI)
   a formalism of k-space widely used in magnetic resonance imaging (MRI) introduced in 1979 by Likes and in 1983 by Ljunggren and Twieg.
   In MRI physics, k-space is the 2D or 3D Fourier transform of the MR image measured.

We shall introduce the terms K-mux, Kmux, or KMx for the Wavefront multiplex; and K-muxing, Kmuxing, or KMxing for the Wavefront multiplexing. In Electromagnetic (EM) theory, the letter K is often used to represent a directional vector and is a wave number in a propagation direction. The term ($\omega t$-K·R) has been used extensively for propagation phase. K represents a directional (moving) surface and R a directional propagation displacement. Therefore K is a "wavefront" mathematically. We will be using K-space as wavefront domain or wavefront space.

SUMMARY OF THE INVENTION

The disclosure relates to methods and architectures of distributed data storage using Wavefront multiplexing (WF muxing) or simply K-muxing. It is focused to data privacy, redundancy, storage reliability, and survivability. The WF muxing or K-muxing techniques will use less memory space to achieve better redundancy, reliability, and survivability as compared to conventional techniques of (1) segmenting, or striping, a stream of data into M substreams, (2) creating additional N redundancy among the M substreams via parity or equivalent techniques, and (3) encrypting all M+N sets of substreams before storing them in M+N separated data storage space.

In addition, these proposed techniques enable the capabilities of monitoring data integrity of stored data sets without scrutinizing the stored data sets themselves. The same techniques can be extended to data streaming via cloud.

This invention application addresses enhanced privacy, reliability, and survivability of stored data, and data transports on cloud via wavefront multiplexing (WF muxing)/ demultiplexing (demuxing) or K-muxing/demuxing methods and techniques. Since stored data on multiple sites is preprocessed on client sides, each of the stored data on cloud is a multiplexed (muxed) data set individually which is unintelligible by itself. Therefore, the proposed approaches shall remove the concerns on integrity confidence of operators, and those on the right of stored data. Camouflaged (image) cloud data storage and transport is one highlight of this application. Embodiments of "writing" and "reading" processes will be presented. "Writing" features a process on multiple original images concurrently via WF muxing transformations, generating WF muxed (image) data to be stored on cloud. A "reading" process corresponds to a WF demuxing transformation on WF muxed (image) data stored on cloud, reconstituting original (image) data sets.

This invention application addresses enhanced privacy, reliability and survivability of stored data, and data transports on cloud via wavefront multiplexing (WF muxing)/demultiplexing (demuxing) methods and techniques. Since stored multiple sets of data have be preprocessed on client sides, each of the stored data on cloud is a multiplexed (muxed) data set individually which is unintelligible by itself. Therefore, the proposed approaches shall remove the concerns on confidence of operator integrity, and those on the right of stored data. For image data sets, camouflaged (image) cloud data storage and transport is one highlight of this application. Embodiments of "writing" and "reading" processes will be presented. "Writing" features a process on multiple original images concurrently via WF muxing transformations, generating WF muxed (image) data to be stored on cloud. A "reading" process corresponds to a WF demuxing transformation on WF muxed (image) data stored on cloud, reconstituting original (image) data sets.

Wavefront multiplexing/demultiplexing (WF muxing/demuxing) process features an algorithm invented by Spatial Digital Systems (SDS) for satellite communications where transmissions demand a high degree of power combining, security, reliability, and optimization [1,2]. WF muxing/demuxing, embodying an architecture that utilizes multidimensional transmissions, has found applications in fields beyond the satellite communication domain. One such application is data storage on cloud where privacy, data integrity, and redundancy are important for both data transports and data storage. User devices include fixed desktop personal computers (PC), relocatable notebooks, and portable devices, including smart phones and smart tablets such as iPhone, and iPad.

A method for storing data in IP cloud comprises: transforming multiple first data sets into multiple second data sets at a transmitting site, wherein one of said second data sets comprises a weighted sum of said first data sets; storing said second data sets in an IP cloud via an Internet; and storing multiple links linking to said second data sets at said transmitting site. In accordance with an embodiment, the method may comprise storing said second data sets at a receiving site via Internet in accordance with said links.

In accordance with an embodiment, the method may comprise storing said second data sets at a receiving site via Internet in accordance with said links.

In accordance with an embodiment, the method may comprise transforming said second data sets into multiple third data sets at a receiving site, wherein one of said third data sets comprises a weighted sum of said second data sets.

In accordance with an embodiment, one of said second data sets carries an image with intensities mainly controlled by one of said first data sets.

A data processing method comprises: transforming multiple first data sets and a known data set into multiple second data sets at a transmitting site, wherein one of said second data sets comprises a weighted sum of said first data sets; and recovering a third data sets from some of said second data sets and said known data set at a receiving site, wherein one of said third data sets comprises a weighted sum of said some of said second data sets.

A method for storing data in IP cloud, comprises: transforming multiple first data sets into multiple second data sets at a transmitting site, wherein one of said second data sets comprises a weighted sum of said first data sets and carries an image with intensities mainly controlled by one of said first data sets.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 6:
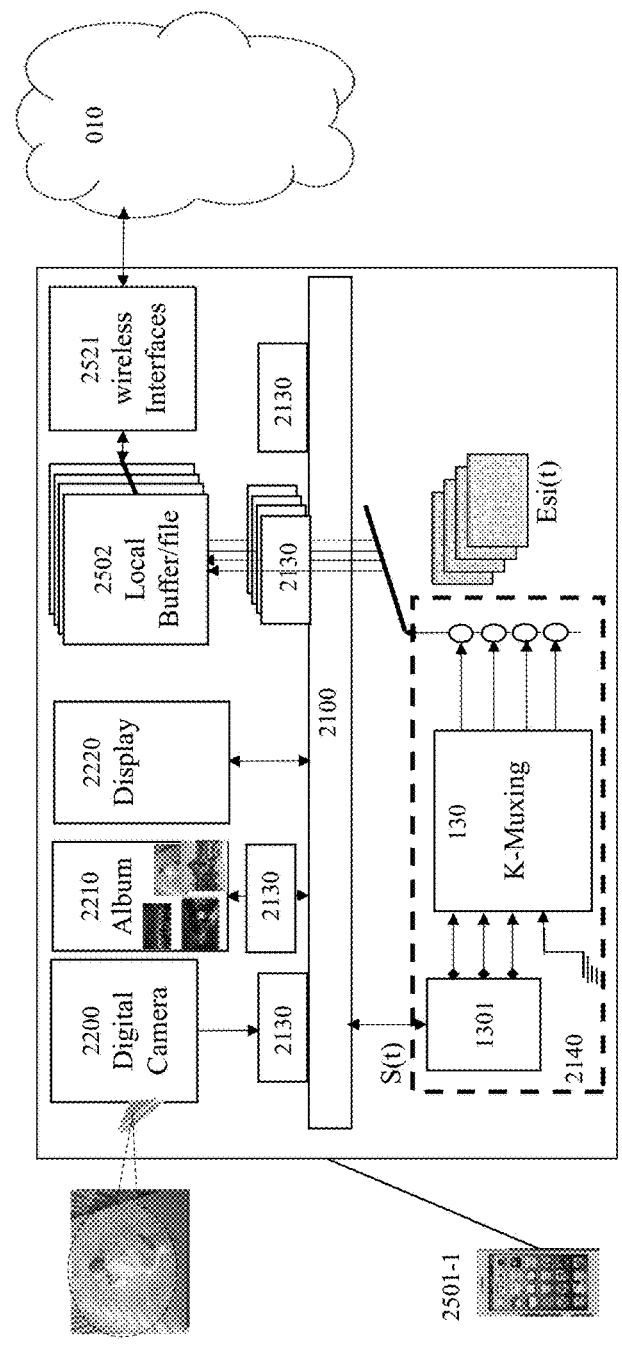

FIG. 6 depicts a block diagram of a data writing processing on distributed data storage on cloud for an image data set via techniques of 4-to-4 Wavefront muxing also known as K-muxing from a mobile device according to embodiments of the present disclosure. The cloud storage features data privacy and a 3 for 4 redundancy.

Figure 7:
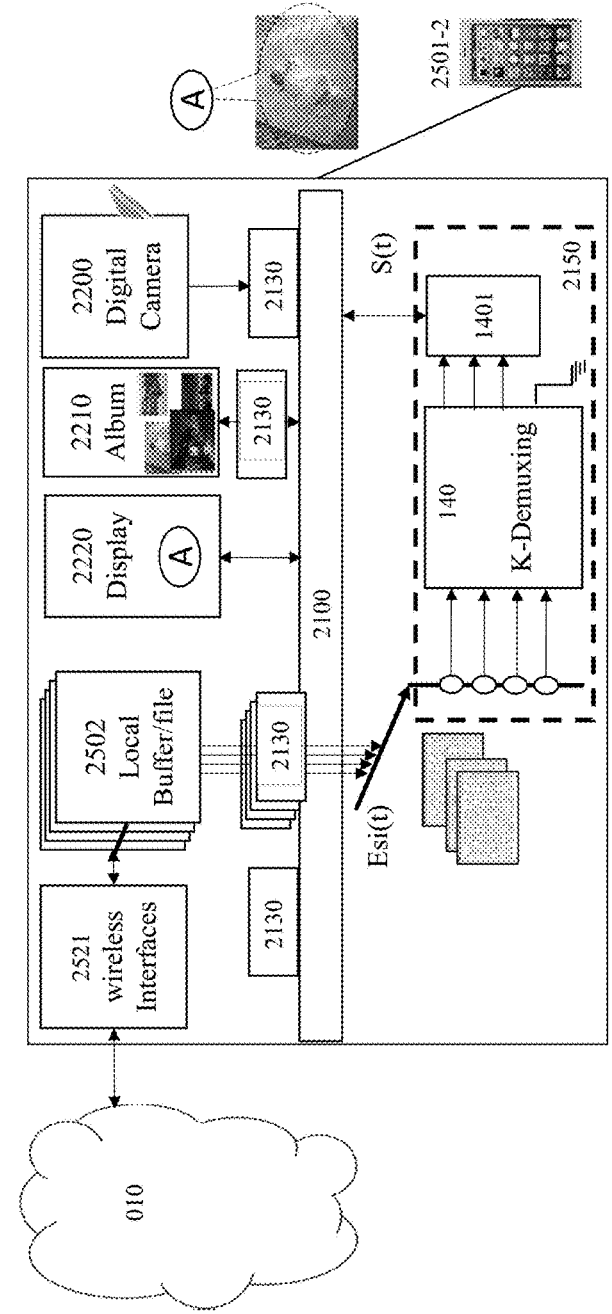

FIG. 7 depicts a block diagram of data reading process from distributed data storage on cloud for an image in a mobile device via techniques of Wavefront muxing/demuxing, also known as K-muxing/demuxing according to embodiments of the present disclosure. The cloud storage features data privacy and a 3 for 4 redundancy.

Figure 8:
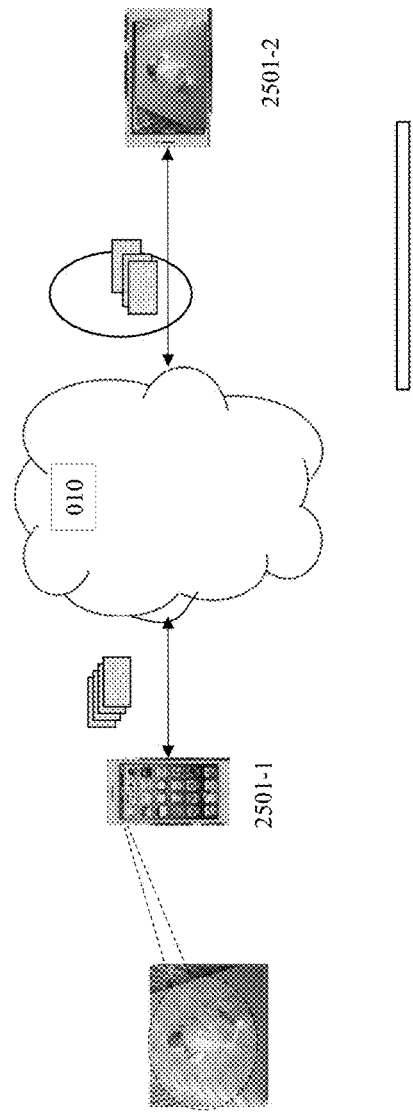

FIG. 8 depicts a block diagram of data writing on distributed data storage on cloud for an image from a mobile device and associated data reading processing in another mobile device via techniques of Wavefront muxing/demuxing, also known as K-muxing/demuxing according to embodiments of the present disclosure. The cloud storage features data privacy and a 3 for 4 redundancy.

Figure 9:
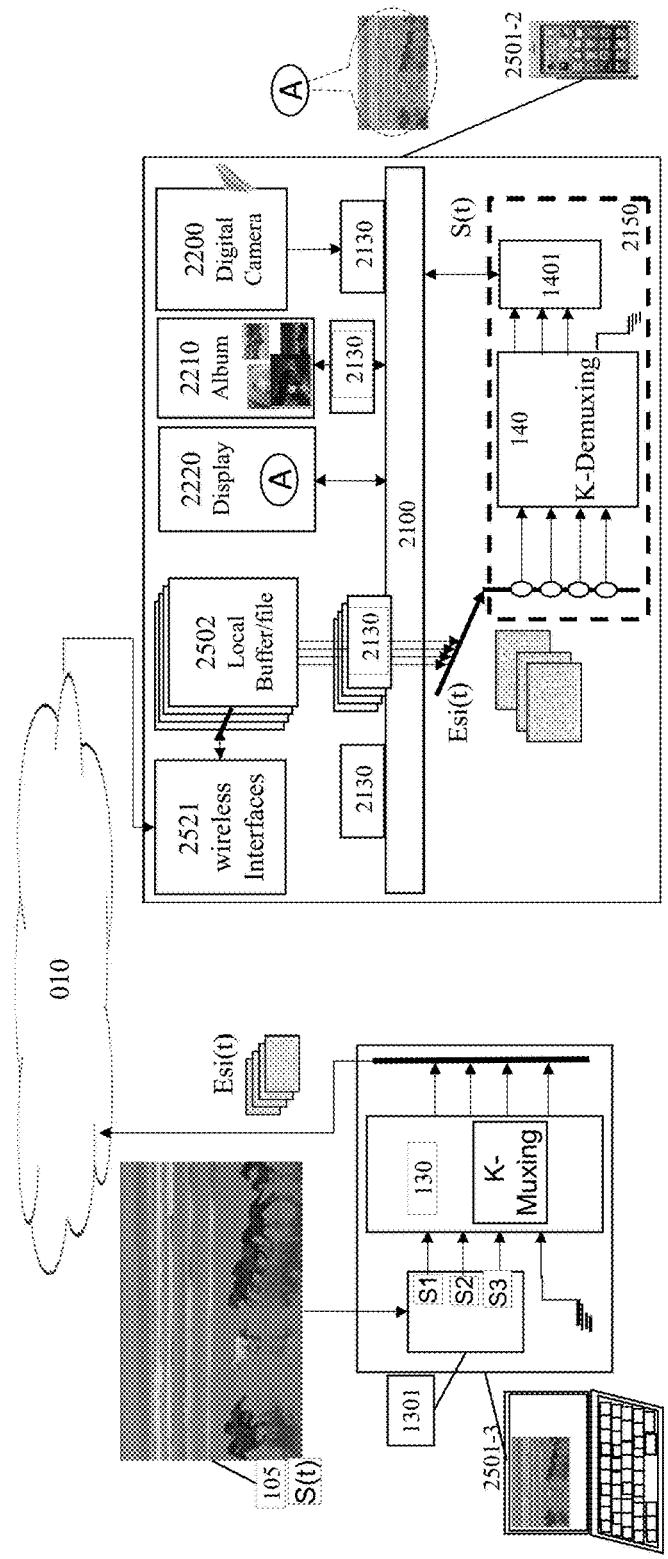

FIG. 9 depicts a block diagram of data writing on distributed data storage on cloud for an image from a fixed PC or a notebook via techniques of Wavefront muxing or K-muxing; and associated data reading processing in a mobile device via techniques of Wavefront demuxing, also known as K-demuxing according to embodiments of the present disclosure. The cloud storage features data privacy and a 3 for 4 redundancy.

FIG. 9A illustrates a simplified version of the same block diagram in FIG. 9. The cloud storage features data privacy and a 3 for 4 redundancy according to embodiments of the present disclosure.

Figure 9B:
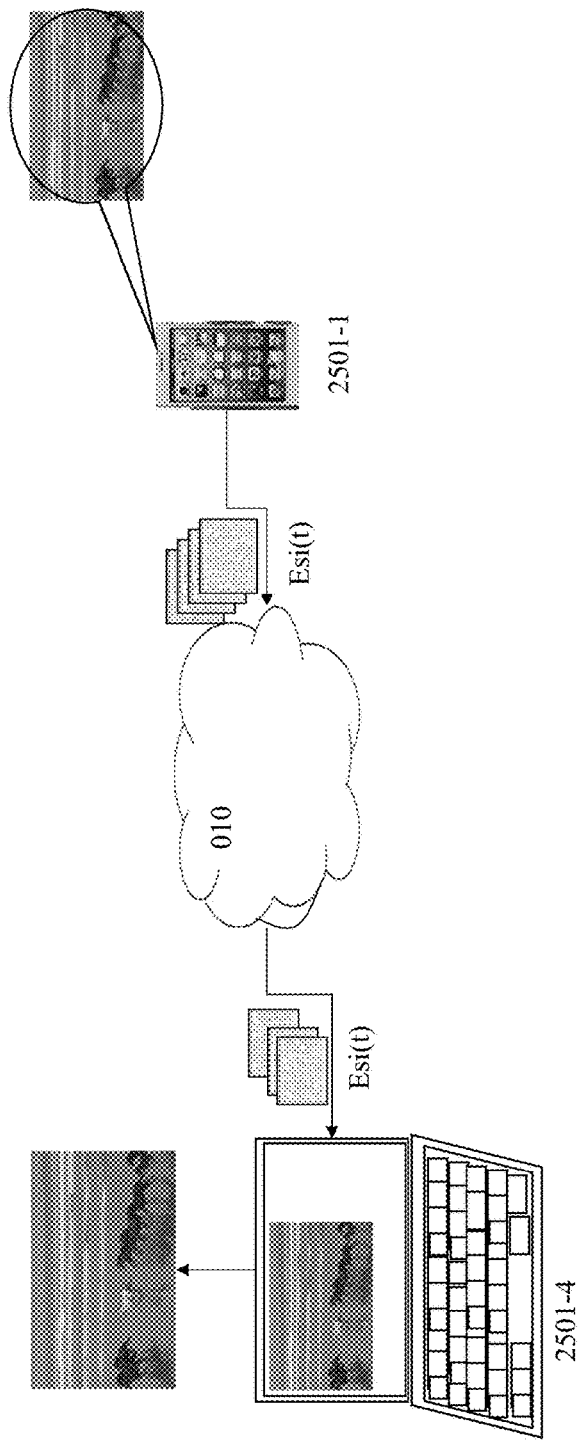

FIG. 9B illustrates a similar block diagram as that in FIG. 9A. But the data writing on distributed data storage on cloud for an image is from a mobile device via techniques of Wavefront muxing or K-muxing; and associated data reading processing in a fixed PC or a notebook via techniques of Wavefront demuxing, also known as K-demuxing according to embodiments of the present disclosure. The cloud storage features data privacy and a 3 for 4 redundancy.

Figure 10:
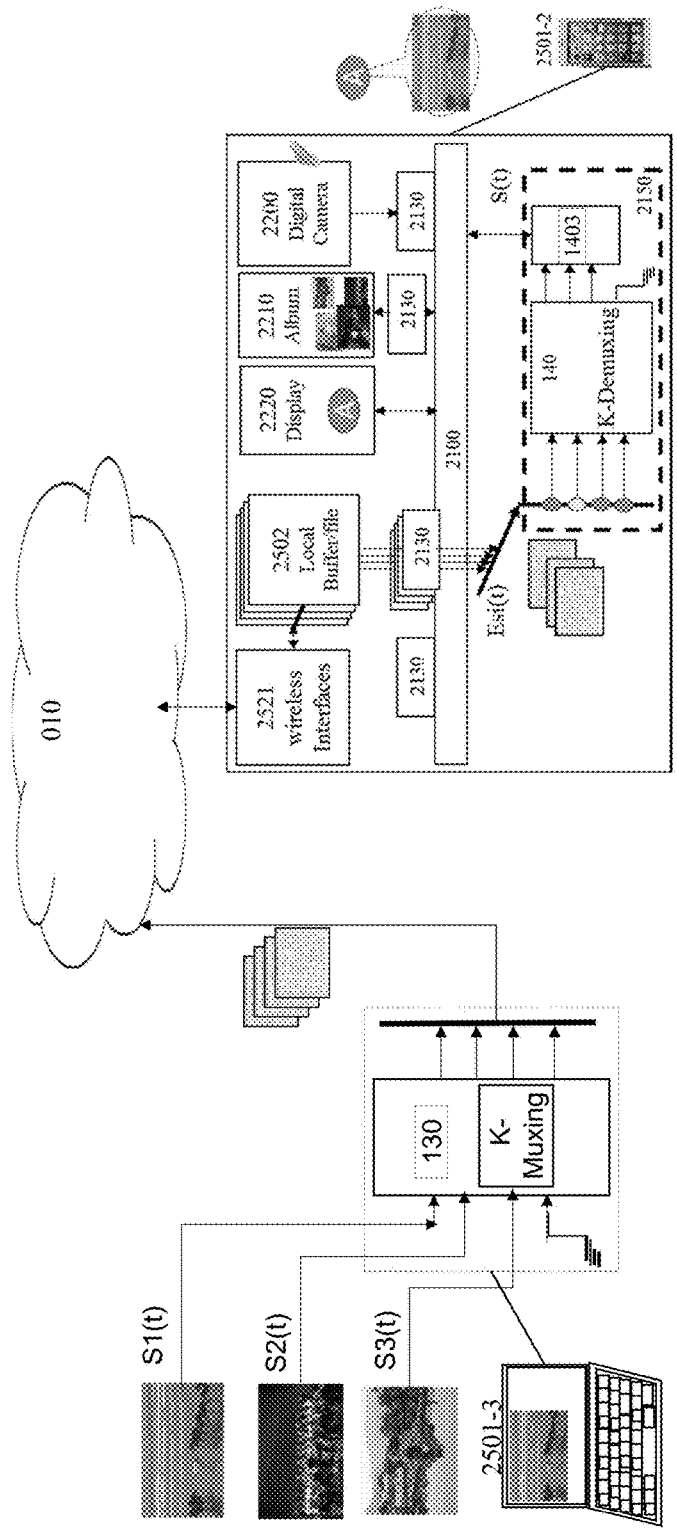

FIG. 10 depicts a block diagram of data writing on distributed data storage on cloud for three images concurrently from a fixed PC or a notebook via techniques of Wavefront muxing or K-muxing; and associated data reading processing in a mobile device for one of the three stored images on cloud via techniques of Wavefront demuxing, also known as K-demuxing according to embodiments of the present disclosure. The cloud storage features data privacy and a 3 for 4 redundancy.

Figure 10A:
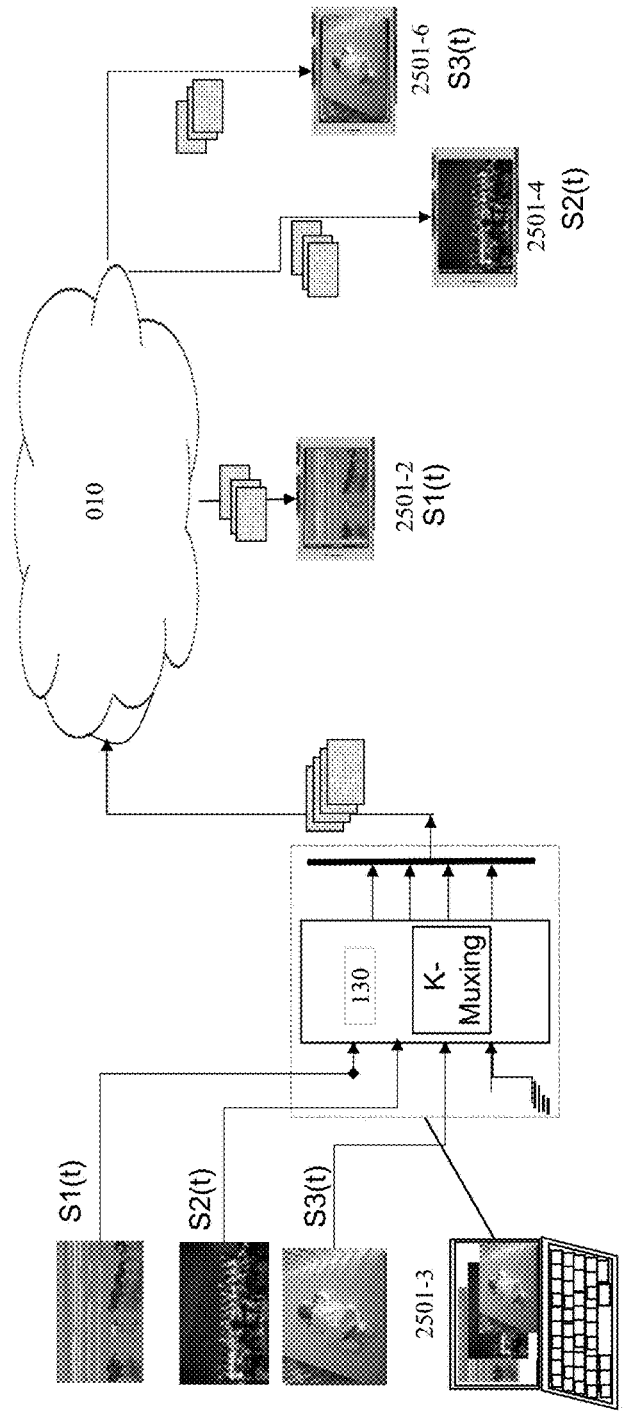

FIG. 10A depicts a simplified block diagram of data writing on distributed data storage on cloud for three images concurrently from a fixed PC or a notebook via techniques of Wavefront muxing or K-muxing; and associated data reading processing in three separated mobile devices; each for one of the three stored images on cloud individually via techniques of Wavefront demuxing, also known as K-demuxing according to embodiments of the present disclosure. The cloud storage features data privacy and a 3 for 4 redundancy.

Figure 11:
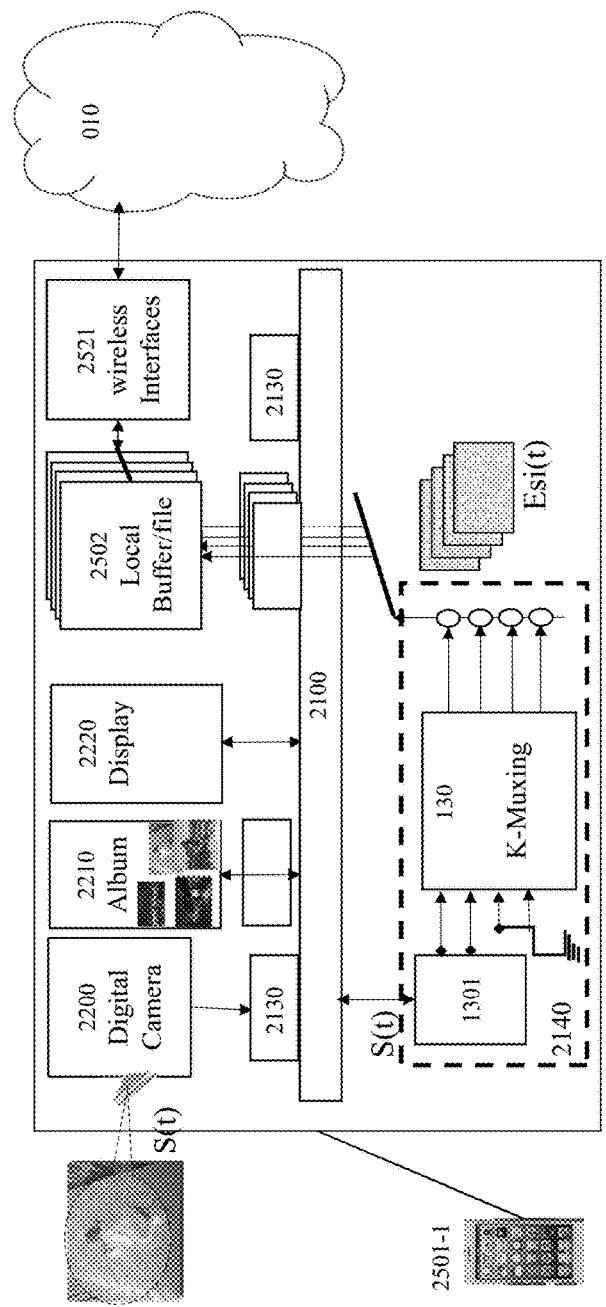

FIG. 11 depicts a block diagram of data writing on distributed data storage on cloud for an image from a mobile device via techniques of Wavefront muxing or K-muxing according to embodiments of the present disclosure. The cloud storage features data privacy and a 2 for 4 redundancy.

Figure 12:
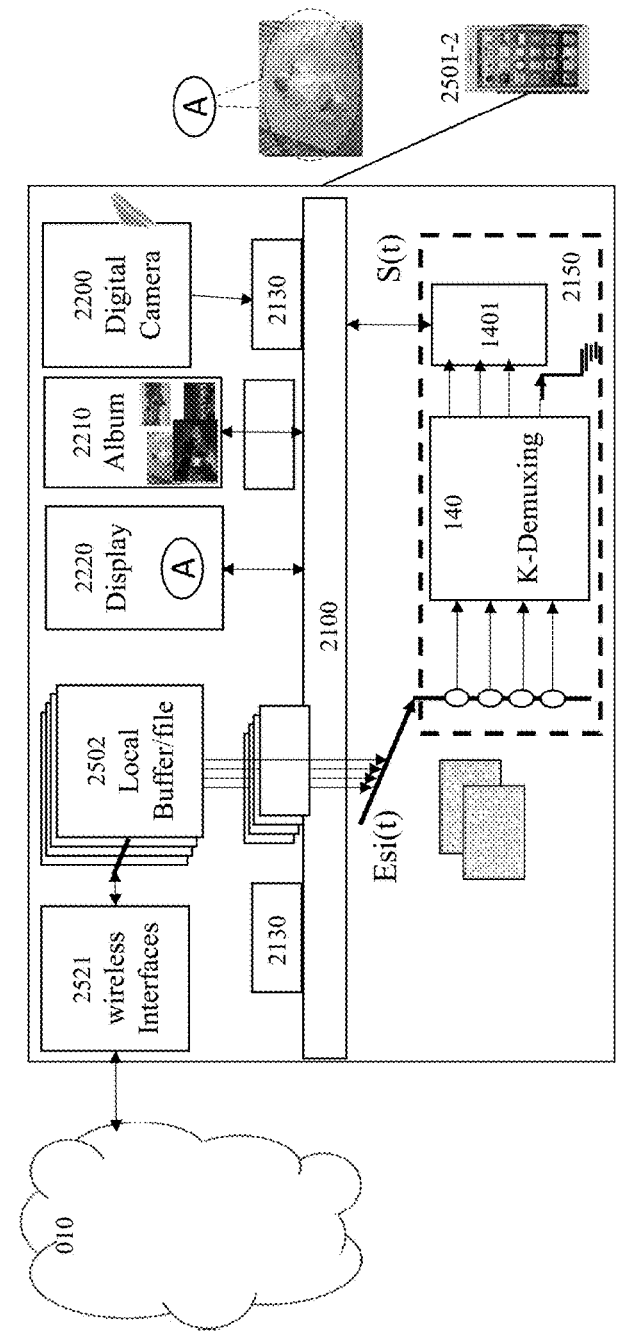

FIG. 12 depicts a block diagram of data reading from distributed data storage on cloud via techniques of Wavefront demuxing or K-demuxing according to embodiments of the present disclosure. The cloud storage features data privacy and a 2 for 4 redundancy.

Figure 13:
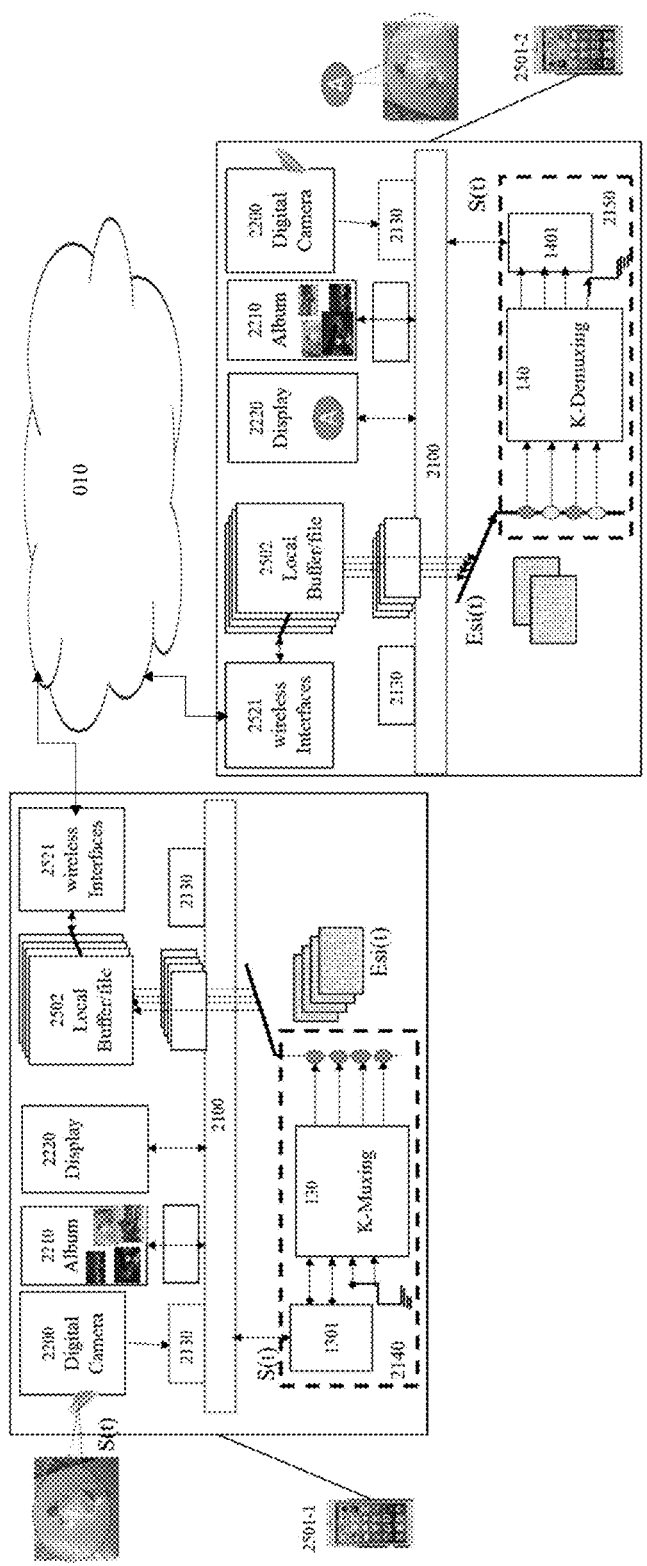

FIG. 13 depicts a block diagram of data writing on distributed data storage on cloud for an image from a mobile device via techniques of Wavefront muxing or K-muxing, and data reading from distributed data storage on cloud via techniques of Wavefront demuxing or K-demuxing according to embodiments of the present disclosure. The cloud storage features data privacy and a 2 for 4 redundancy.

Figure 13A:
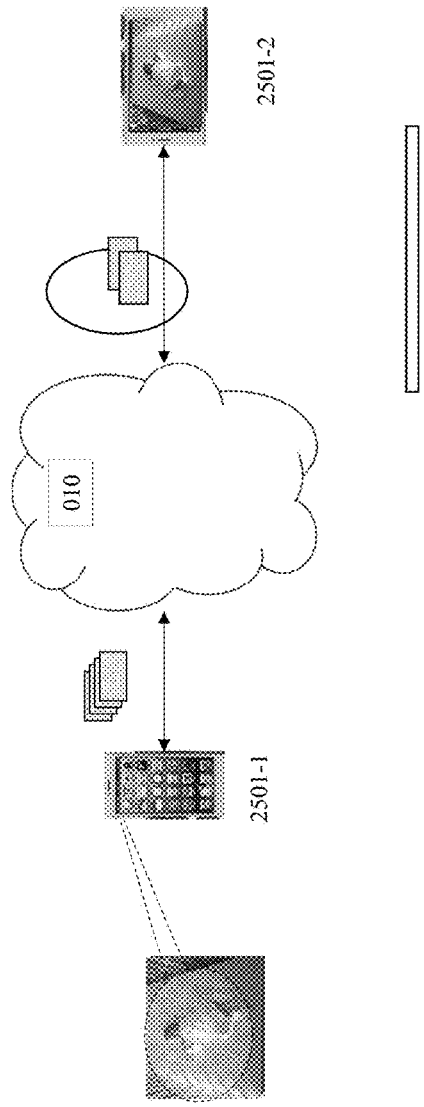

FIG. 13A depicts a simplified block diagram of data writing and reading on cloud according to embodiments of the present disclosure; same as that shown in FIG. 13.

Figure 14:
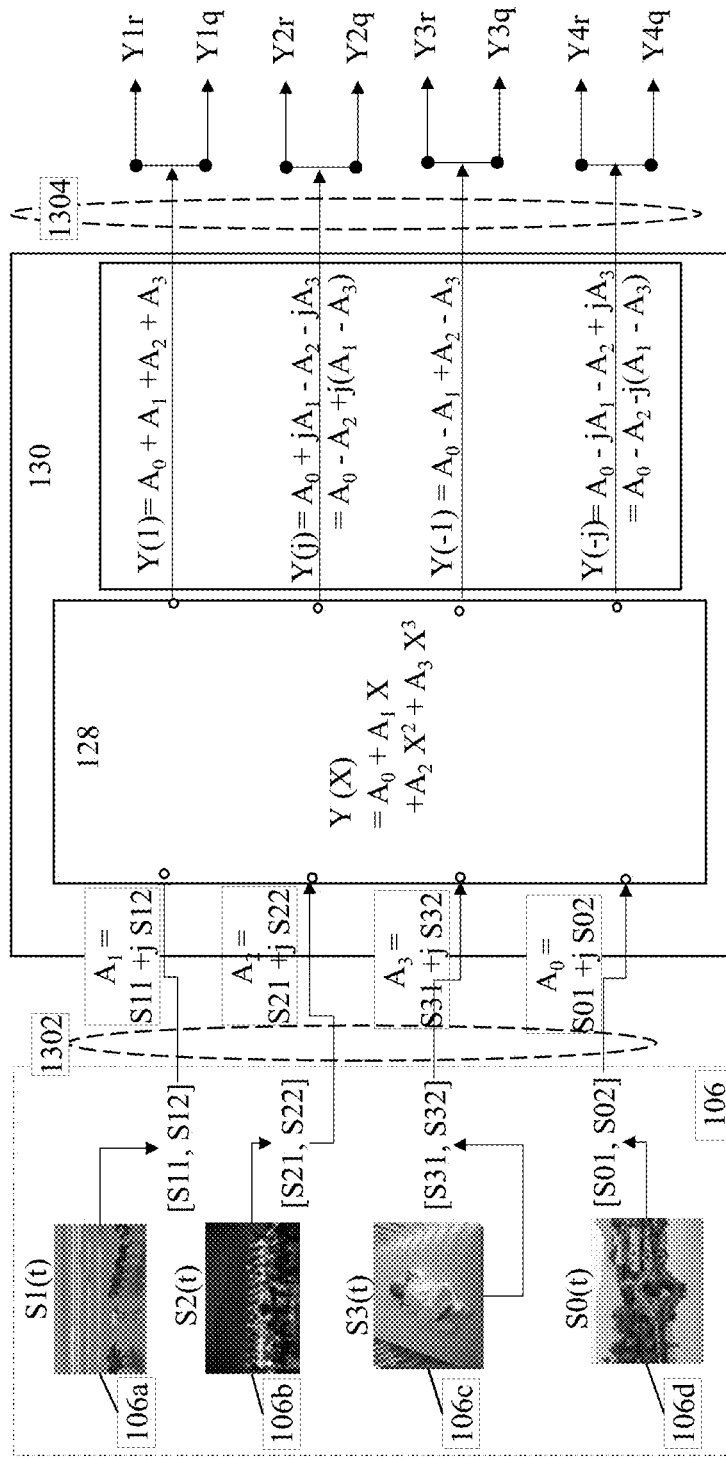

FIG. 14 depicts a simplified block diagram of a K-muxing via erasure code techniques according to embodiments of the present disclosure.

Figure 14A:
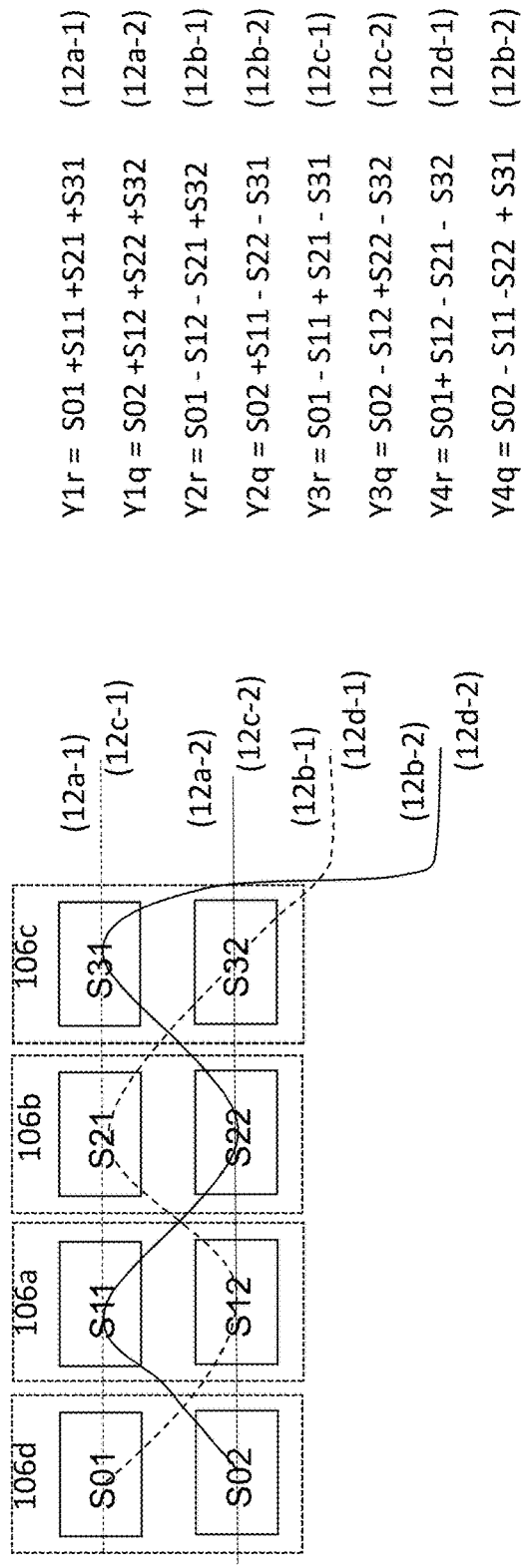

FIG. 14A depicts a block diagram of a 4-to-4 K-muxing with complex numbers via erasure code techniques according to embodiments of the present disclosure.

Figure 14B:
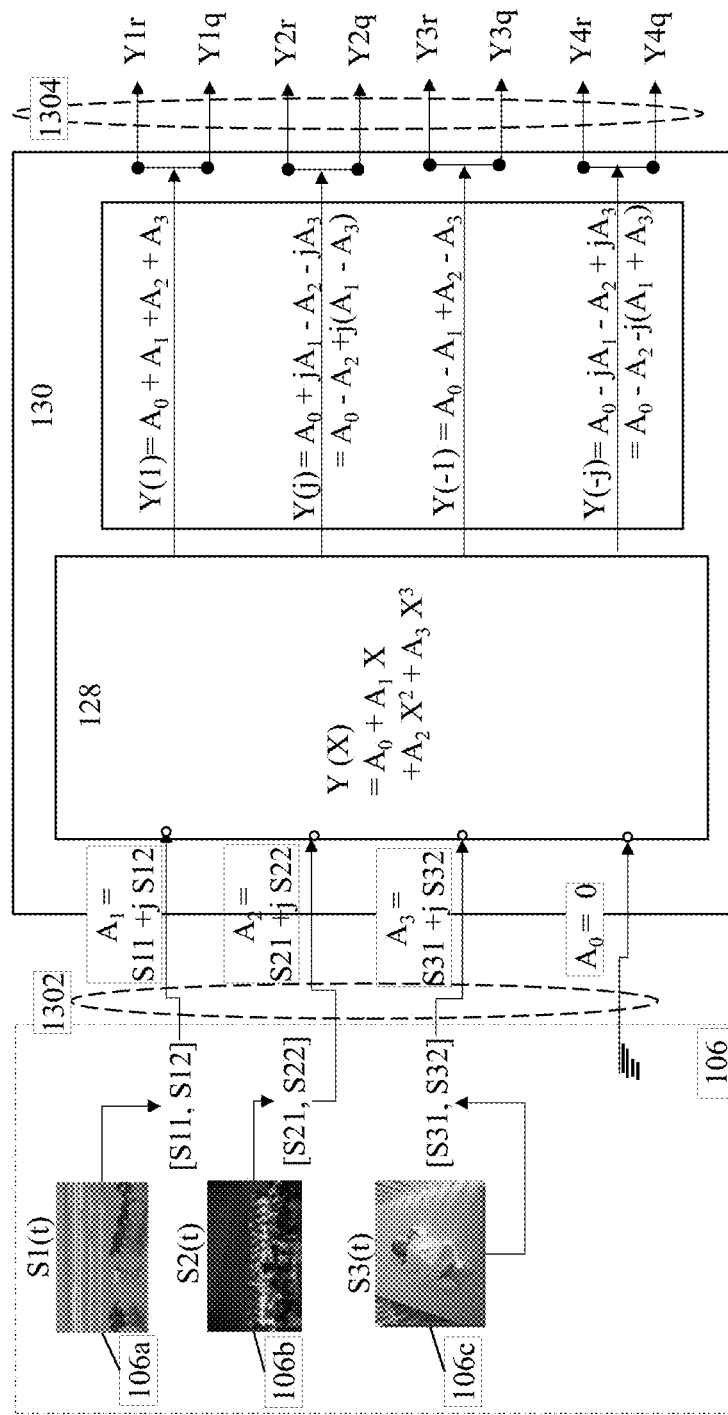

FIG. 14B depicts a simplified block diagram of a K-muxing with redundancy via erasure code techniques according to embodiments of the present disclosure.

Figure 14C:
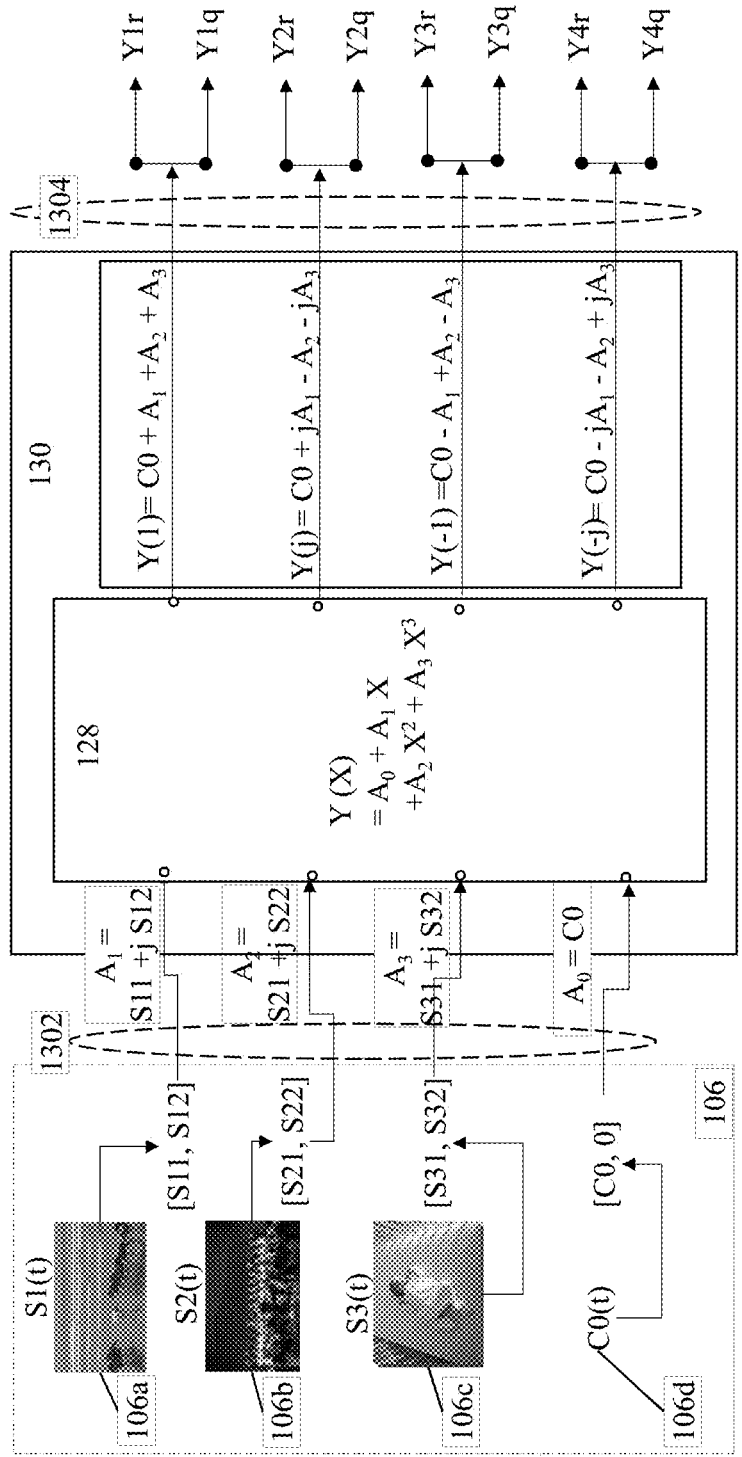

FIG. 14C depicts another simplified block diagram of a K-muxing with redundancy via erasure code techniques according to embodiments of the present disclosure.

Figure 14D:
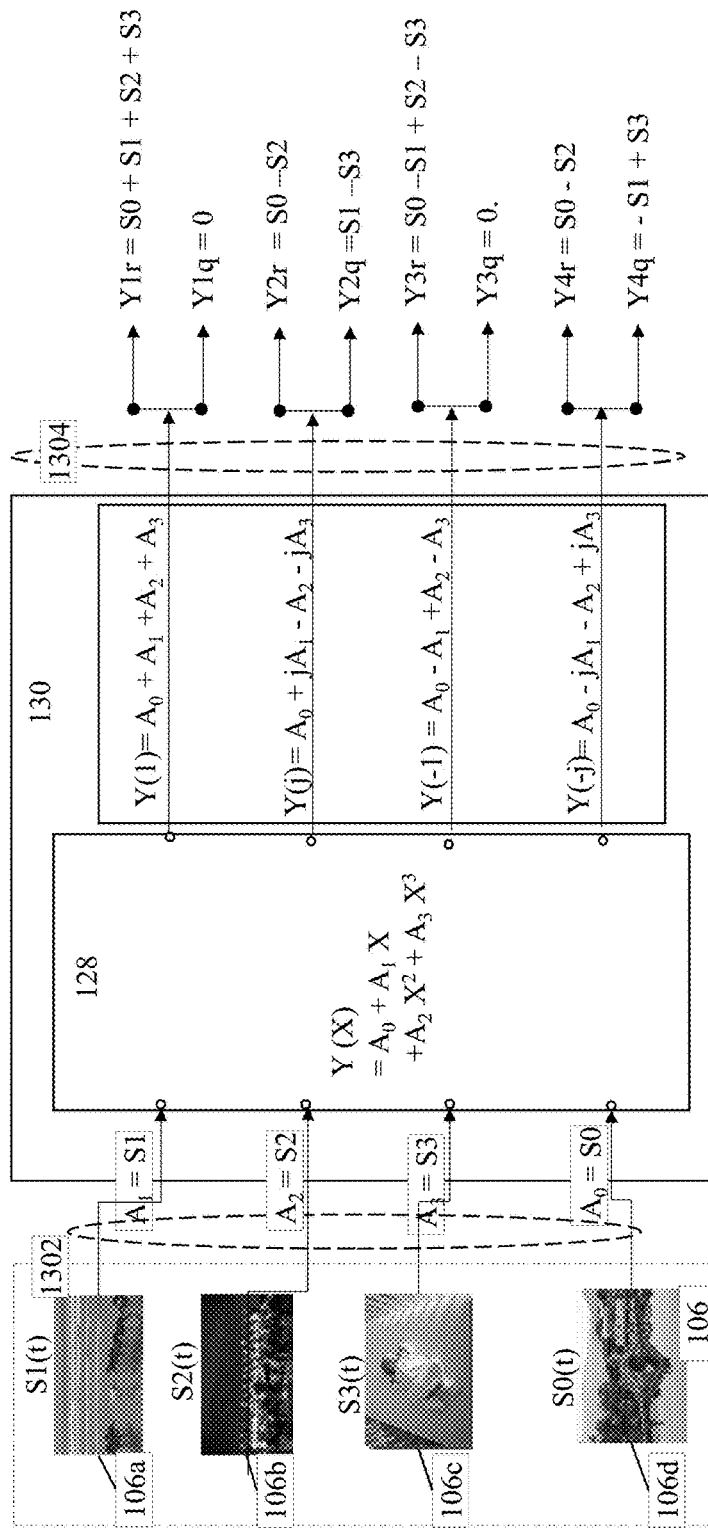

FIG. 14D depicts another simplified block diagram of a K-muxing with redundancy via erasure code techniques according to embodiments of the present disclosure.

Figure 15:
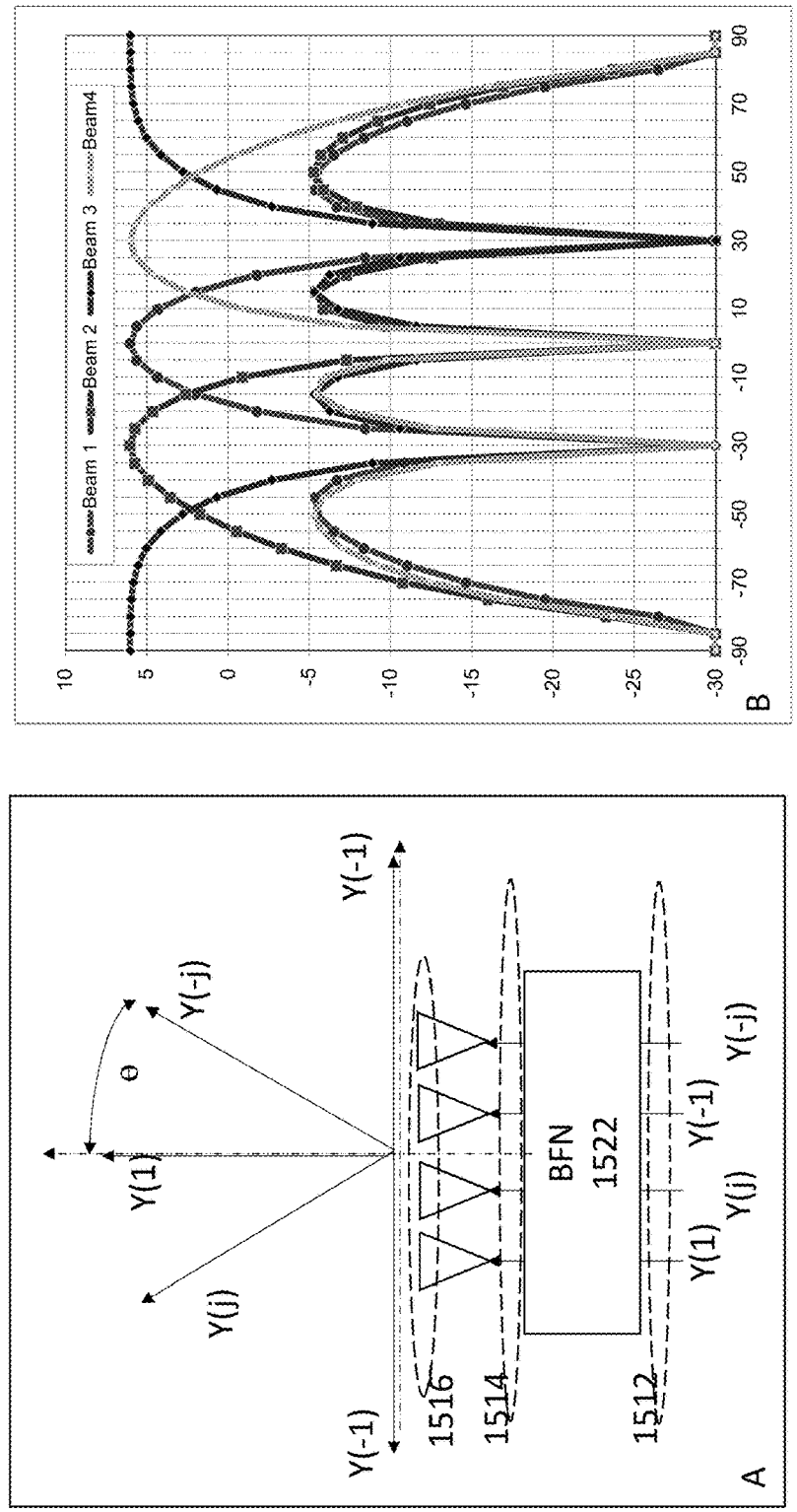

FIG. 15 depicts a block diagram of a K-muxing related to beam forming networks techniques via FFT according to embodiments of the present disclosure.

Figure 16:
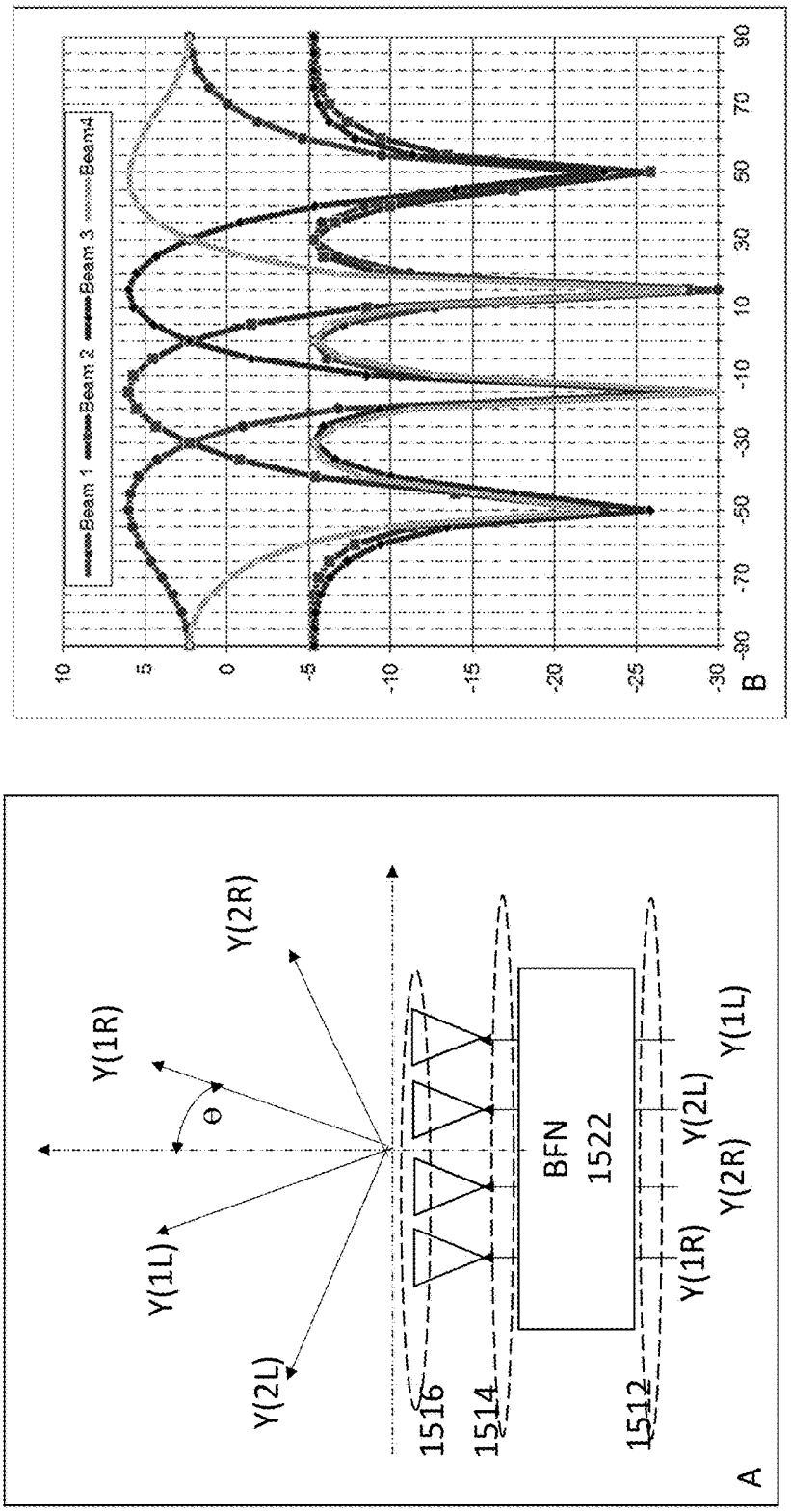

FIG. 16 depicts a block diagram of a K-muxing related to beam forming networks techniques via Butler matrix according to embodiments of the present disclosure.

Figure 16A:
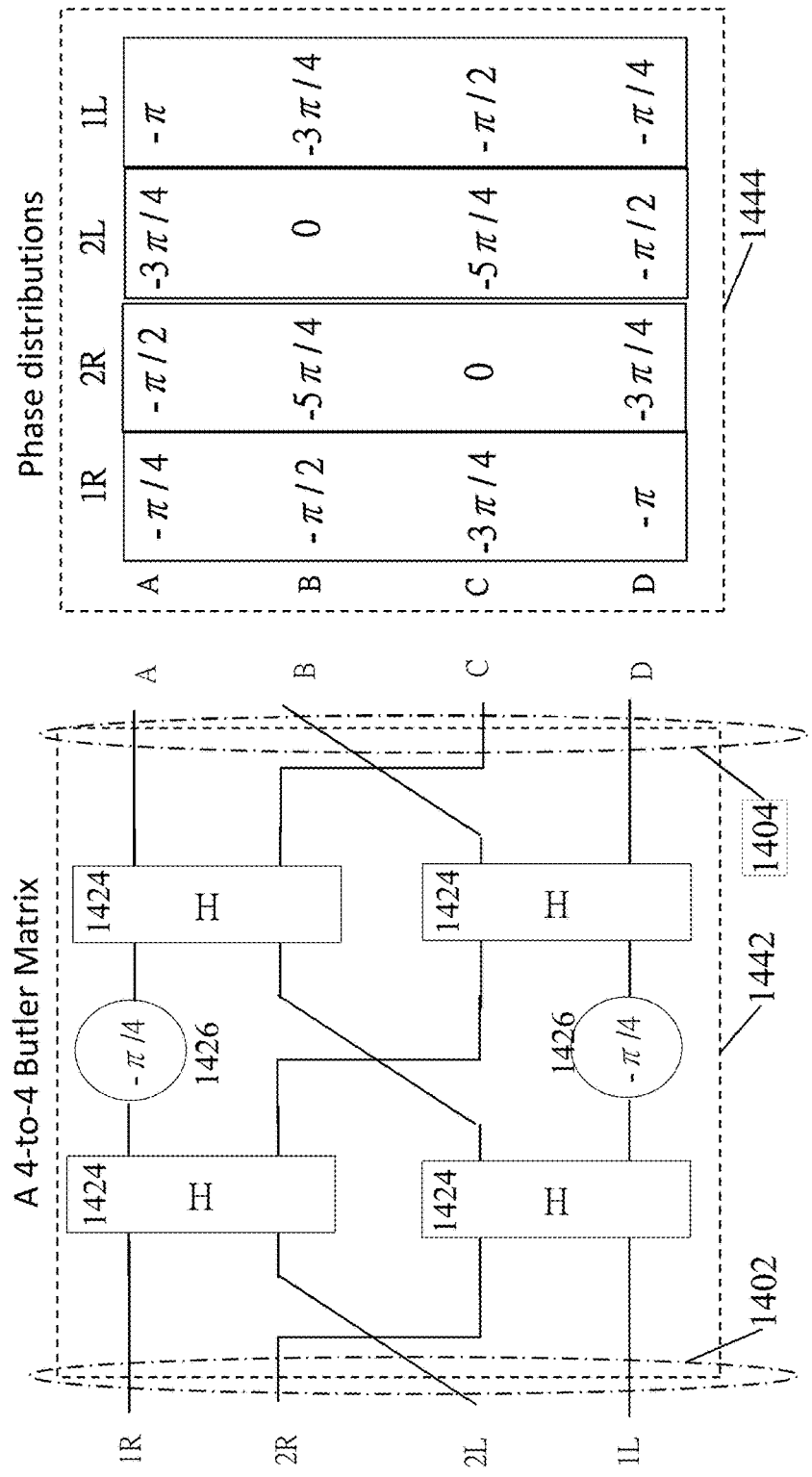
Figure 16B:
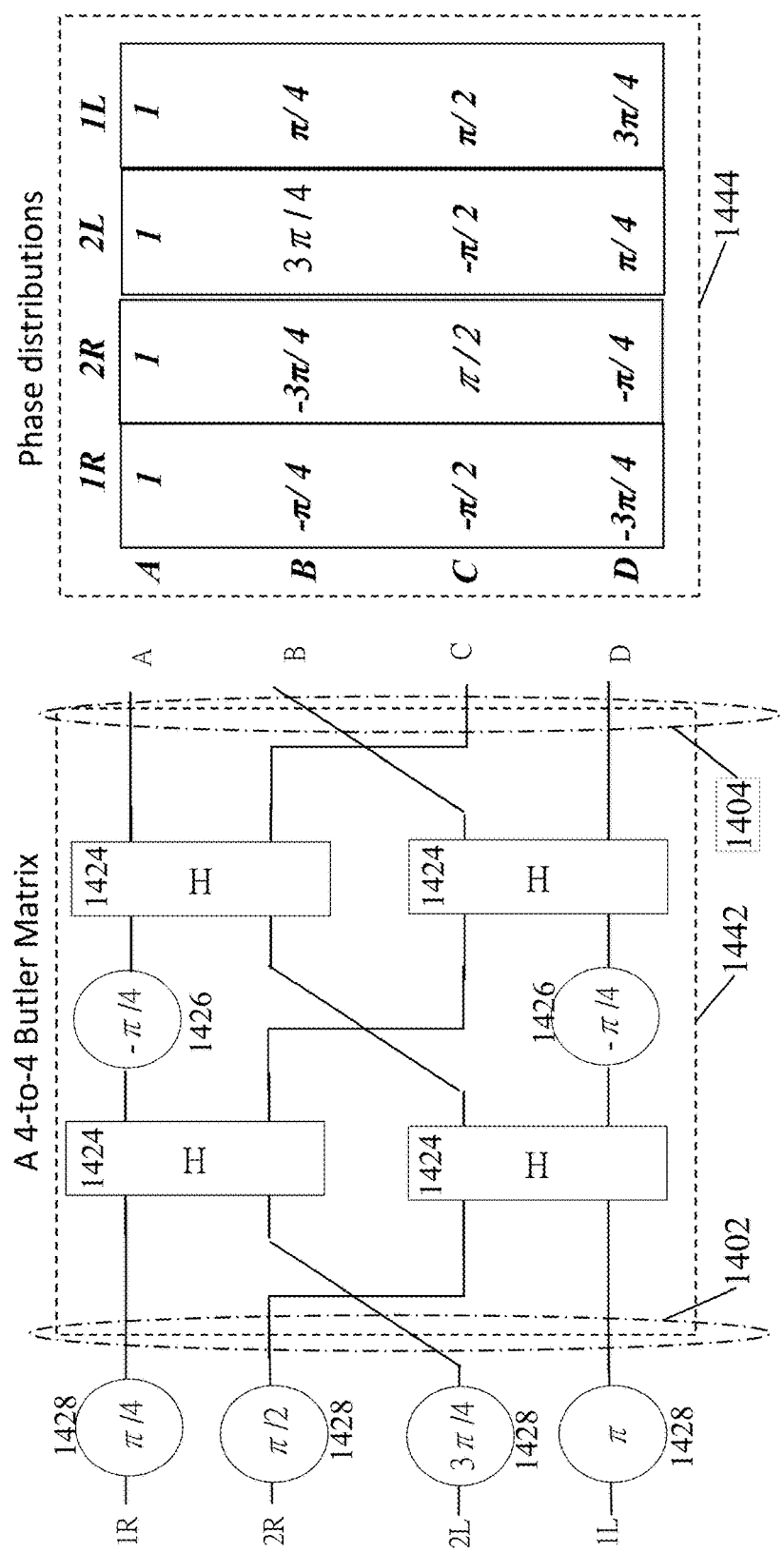

FIG. 16A depicts a block diagram of a Butler matrix to function as multiple beam beam-forming-networks according to embodiments of present disclosure FIG. 16B depicts another block diagram of a Butler matrix to function as multiple beam beam-forming-networks according to embodiments of present disclosure.

Figure 16C:
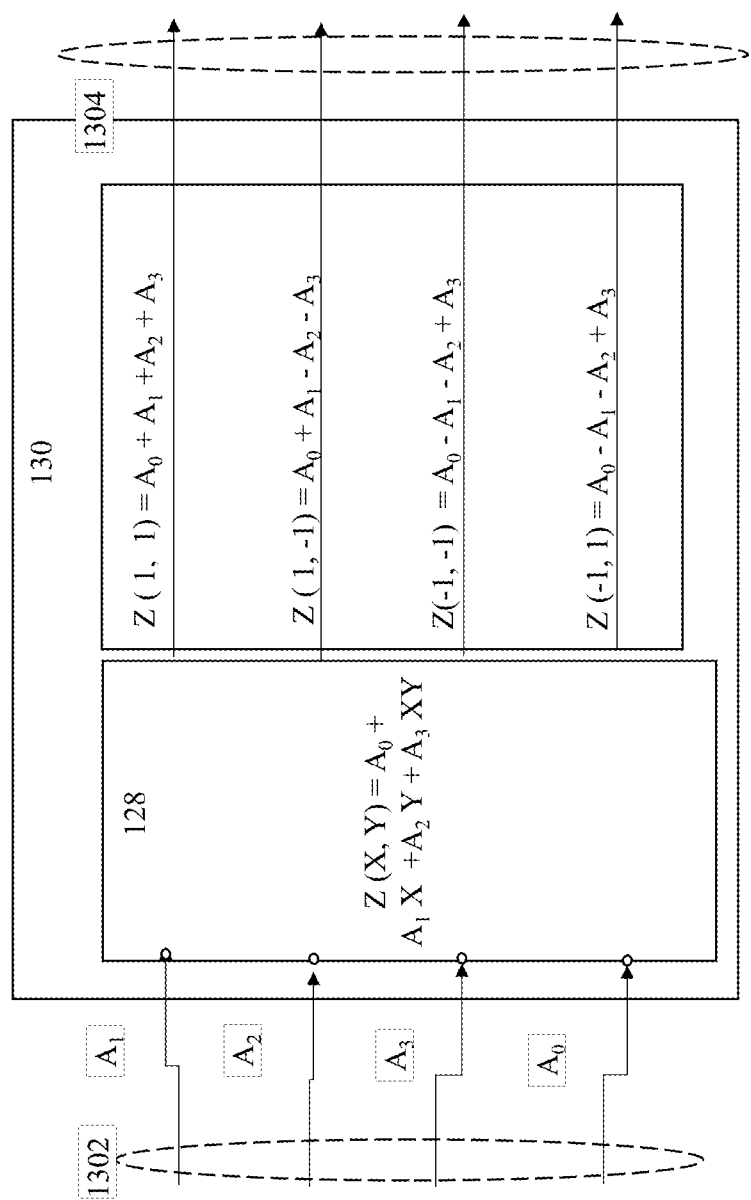

FIG. 16C depicts another block diagram related to generalized polynomial formulation according to embodiments of present disclosure.

Figure 17:
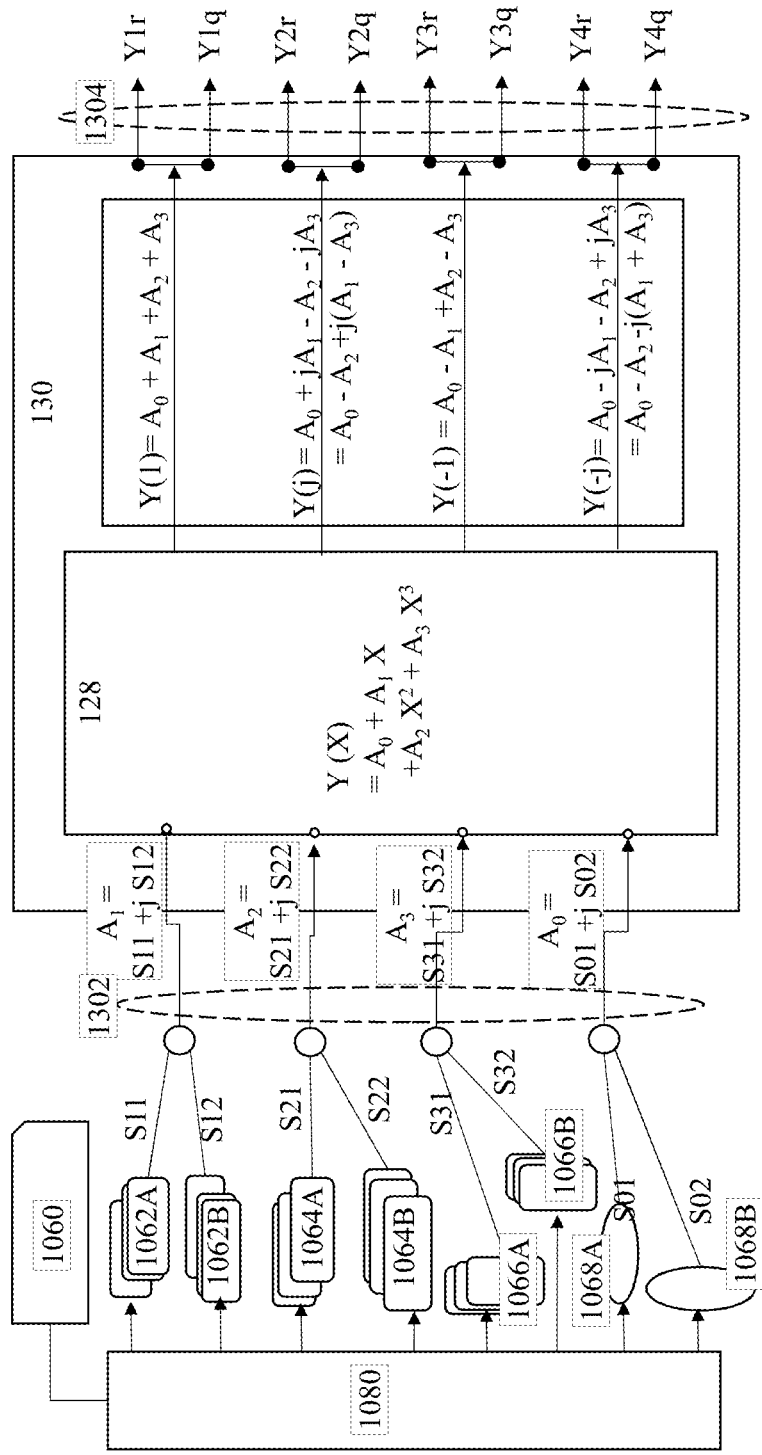

FIG. 17 depicts a simplified block diagram of a K-muxing using erasure code for medical records of patients according to embodiments of the present disclosure.

DETAILED DESCRIPTION OF THE INVENTION

In this disclosure we shall focus, among other features, on how the functions of data redundancy in storage are created. The present invention relates to distributed data storages with built-in redundancy for a single stream data subdivided into M multiple data substreams or M independent data streams, converted into a WF muxed domain (or a K-muxed domain) with M+N output wavefront components (wfcs), and stored these M+N wfc output data into N+M separated data storage sets, where N and M are integers and N>0. WE may refer the M original data streams as original value-data sets or simply value-data sets. As a result, the M+N stored-data sets are wavefront components in forms of linear combinations of the M original value-data sets, which are derivable from the M value-data sets themselves.

Figure 1:
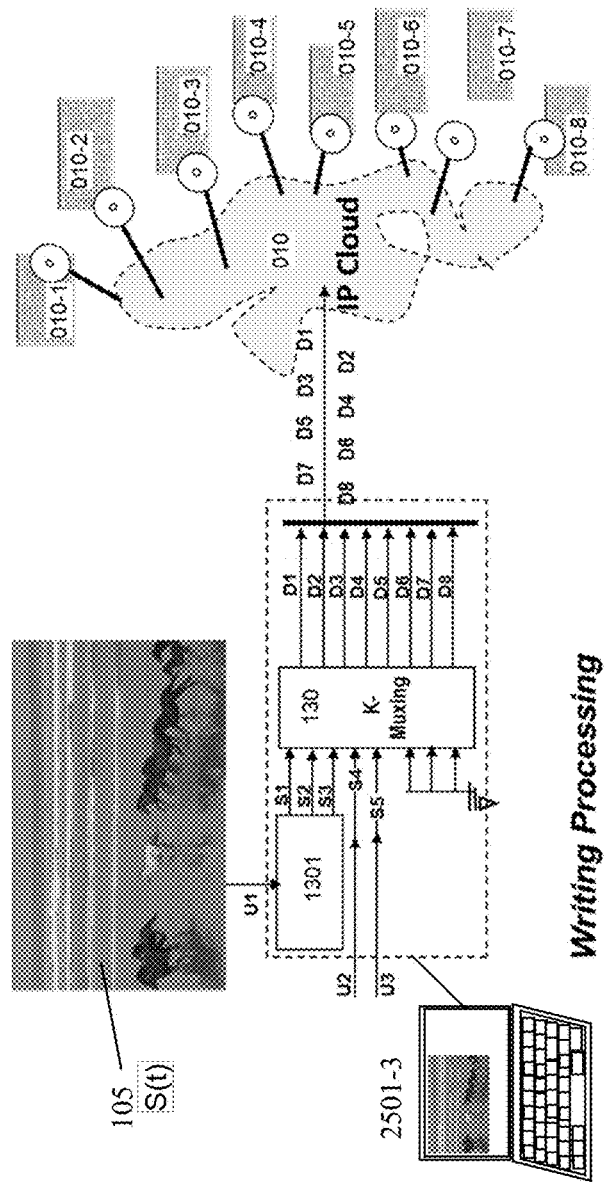
FIG. 1 depicts a block diagram of "writing" data on distributed data storage on cloud for 3 independent data sets via techniques of 8-to-8 Wavefront muxing also known as K-muxing according to embodiments of the present disclosure. The block diagram is modified from FIG. 2A in the U.S. patent application publication No.: U.S.20140081989.

From a linear algebra point of view, it is adequate to use M stored-data sets to represent M value-data sets. However, if we use M+N stored-data sets to represent only M value-data sets; then there are opportunities to have N redundant stored-data sets among the total M+N stored-data sets; creating a M for M+N redundancy structure. We only require any M of the M+N stored-data sets to recover embedded M value-data sets , or N redundant stored data sets FIG. 1 is modified from the FIG. 2 of US patent application publication No. US20140081989, and depicts a writing process to store 5 sets of data, S1, S2, S3, S4 and S5, in 8 physically separated data storage sites 010-1 to 010-8 connected through IP Cloud 010. The writing process features techniques of wavefront multiplexing (WF muxing or a K-muxing 130). The 8-to-8 K-muxing 130 features 8 inputs and 8 outputs. Three of the 8 inputs are grounded. Furthermore, the first three data sets, S1, S2 and S3, are results of segmenting a data set 105 belonged to a first user, U1, by a segmentation processor 1301. The data set 105 is a short video clip on wild life. Input data sets S4 and S5 belong to second and third users, U2 and U3 respectively. The 3 other inputs to the 8-to-8 K-muxing 130 are grounded.

In a pre-storage processing, the 8-to-8 K muxing 130 is used to convert 5 sets of input data S1, S2, S3, S4 and S5, to 8 sets of output data, i.e. D1, D2, D3, D4, D5, D6, D7 and D8, where:

$$D1 = S1+S2+S3+S4+S5 \tag{1-1}$$

$$D2 = S1-S2+S3-S4+S5 \tag{1-2}$$

$$D3 = S1+S2-S3-S4+S5 \tag{1-3}$$

$$D4 = S1-S2-S3+S4+S5 \tag{1-4}$$

$$D5 = S1+S2+S3+S4-S5 \tag{1-5}$$

$$D6 = S1-S2+S3-S4-S5 \tag{1-6}$$

$$D7 = S1+S2-S3-S4-S5 \tag{1-7}$$

$$D8 = S1-S2-S3+S4-S5 \tag{1-8}$$

A 8-to-8 Hadamard matrix HM, in which all elements are "1" or "−1" was chosen for the 8-to-8 K-muxing. The 8-to-8 K-muxing may be implemented by other orthogonal matrix such as Fourier transfer or any 8×8 full rank matrixes with realizable inversed matrixes.

The input ports of the K-muxing 130 are referred to as slices, and its output ports are wavefront components (wfc's). In this example, the five input data sets, i.e. S1, S2, S3, S4 and S5, are connected to the input ports, i.e. slice 1, slice 2, slice 3, slice 4 and slice 5, of the K-muxing 130 respectively. The 8 output data sets, i.e. D1-D8, are connected to the output ports, i.e. wfc1-wfc8, of the K-muxing 130 respectively.

To create effective redundancy for data storage on cloud, two of the three grounding inputs, say the inputs of the 6$^{th}$ and the 7$^{th}$ slices, shall be assigned as weighted sums of "all other 6 inputs" for Hadamard Matrices and many orthogonal matrixes instead of a constant. In this case the last input slice for the 8-to-8 is grounded or assigned a constant value of zero.

$$D1 = S1+S2+S3+S4+S5+f1+f2+0 \tag{1-1a}$$

$$D2 = S1-S2+S3-S4+S5-f1-f2-0 \tag{1-2a}$$

$$D3 = S1+S2-S3-S4+S5+f1-f2-0 \tag{1-3a}$$

$$D4 = S1-S2-S3+S4+S5-f1-f2+0 \tag{1-4a}$$

$$D5 = S1+S2+S3+S-4-S5-f1-f2-0 \tag{1-5a}$$

$$D6 = S1-S2+S3-S4-S5+f1-f2+0 \tag{1-6a}$$

$$D7 = S1+S2-S3-S4-S5-f1+f2+0 \tag{1-7a}$$

$$D8 = S1-S2-S3-+S4-S5+f1+f2-0 \tag{1-8a}$$

where $f1 = S1+2*S2+S3+S4+S5+0$ (1-9a)

$f2 = S1+S2+2*S3+S4-S5+0$ (1-9b)

Equations (1-1a) to (1-8a) can be written in a matrix form as $$D = HM*S \tag{2}$$

where: $D = [D1, D2, D3, D4, D5, D6, D7, D8]^T$ (2-1)

$$HM = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \tag{2-2}$$

$$S = [S1, S2, S3, S4, S5, f1, f2, 0]^T \tag{2-3}$$

When the K muxing is connected by a unity input data set only, e.g. S4=[1] through the input port of slice 4 and S1=S2=S3=S5=f1=f2=0, the corresponding outputs of the WF muxer are written as:

$$D1\text{ port} = S1+S2+S3+S4+S5+f1+f2+0 = [1] \tag{3-1}$$

$$D2\text{ port} = S1-S2+S3-S4+S-f1+f2-0 = [-1] \tag{3-2}$$

$$D3\text{ port} = S1+S2-S3-S4+S5+f1-f2-0 = [-1] \tag{3-3}$$

$$D4\text{ port} = S-S2-S3+S4+S5-f1-f2+0 = [1] \tag{3-4}$$

$$D5\text{ port} = S1+S2+S3+S4-S5-f-f2-0 = [1] \tag{3-5}$$

$$D6\text{ port} = S1-S2+S3-S4-S5+f1-f2+0 = [-1] \tag{3-6}$$

$$D7\text{ port} = S1+S2-S3-S4.S5-f1+f2+0 = [-1] \tag{3-7}$$

$$D8\text{ port} = S1-S2-S3+S4-S5+f1+f2-0 = [1] \tag{3-8}$$

The 8 output data sets are represented as a column vector or an output column matrix. The elements of the output matrix D, under the condition, become identical to the 8 elements in the 4$^{th}$ column of the HM. In this case, the wavefront vector of the output data sets representing the matrix D is referred to as the 4$^{th}$ wavefront vector (WFV), or WFV4. Similarly, the wavefront vector associated with the k$^{th}$ input port, Slice k, is referred to as k$^{th}$ WFV or WFVk. A WF vector specifies the distribution of a set of input data among the 8-output ports or among 8 aggregated output data sets, i.e. D1, D2, D3, D4, D5, D6, D7 and D8.

In general an 8-to-8 WF muxer, such as the K-muxing 130, features 8 orthogonal WFV's. Let us define a coefficient wjk of a Wavefront (WF) transform, or a K-transform performed by the K-muxing 130 to be the coefficient at the j$^{th}$ row and k$^{th}$ column of the K-muxing 130. A WF vector of the K-muxing 130 featuring a distribution among the 8 outputs, i.e. D1-D8 at the 8 wavefront component (wfc) ports wfc1-wfc8, is defined as an 8-dimensional vector.

With 8 wfc ports in the 8-to-8 K-muxing 130, there shall be 8 mutually orthogonal WFVs. The first 5 WFVs are:

$$WFV1 = [w11, w21, w31, w41, w51, w61, w71, w81]^T \quad (4.1)$$

$$WFV2 = [w12, w22, w32, w42, w52, w62, w72, w82]^T \quad (4.2)$$

$$WFV3 = [w13, w23, w33, w43, w53, w63, w73, w83]^T \quad (4.3)$$

$$WFV4 = [w14, w24, w34, w44, w54, w64, w74, w84]^T \quad (4.4)$$

$$WFV5 = [w15, w25, w35, w45, w55, w65, w75, w85]^T \quad (4.5)$$

S1, S2, S3, S4, and S5 are "attached" to 5 WF vectors by respectively connected to the first five input ports of the K-muxing 130. Similarly f1 and f2 are attached to the WFV6 and the WFV7. As a result, there is a remaining WFV, i.e. WFV8, which is not "utilized" in this illustration. All components of the 8 orthogonal WFVs are related to input and output port numbers or (spatial) sequences, but are independent from the input and output data sets.

Each of the 8 outputs of the K-muxing 130, i.e. D1-D8, is a linear combination of the 8 inputs including S1-S5, f1 and f2. The linear combination with 8 inputs features a weighted sum with each input weighted by a corresponding weighting parameter. As a result, each of the 8 output, i.e. D1-D8, contains information associated with all of the 8 inputs including S1-S5, f1 and f2. The data storage sites 010-1 through 010-8 may store all the 8 output data sets D1-D8, respectively.

Figure 1A:
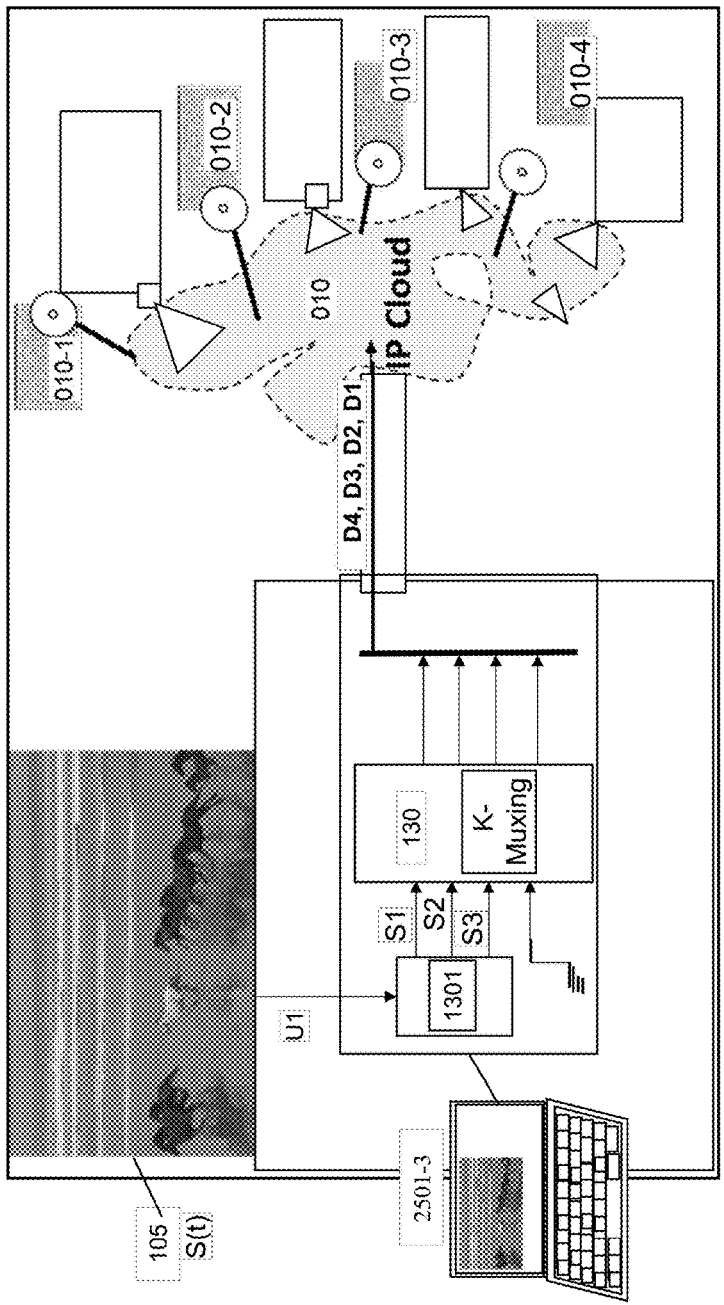
FIG. 1A depicts a block diagram on distributed data storage on cloud for an independent data set via techniques of 4-to-4 Wavefront muxing also known as K-muxing according to embodiments of the present disclosure.

FIG. 1A depicts a writing process to store 3 sets of data, S1, S2, and S3, in 4 physically separated data storage sites 010-1, 010-2, 010-3 and 010-4 connected through IP Cloud 010. The writing process features techniques of wavefront multiplexing (WF muxing or a K-muxing 130). The 4-to-4 K-muxing 130 features 4 inputs and 4 outputs. One of the 4 inputs is grounded. It may also be connected to a known constant or a known data stream. Furthermore, the first three data sets, S1, S2 and S3, are results of segmenting a data set S(t) by a segmentation processor 1301. The data set 105 is a short video clip on wild life. Again, the other input to the 4-to-4 K-muxing 130 is grounded.

In a pre-storage processing, the 4-to-4 K-muxing 130 is used to convert 3 sets of input data, i.e. S1, S2, and S3 to 4 sets of output data, i.e. D1, D2, D3, and D4, where:

$$D1 = S1 + S2 + S3 \quad (5-1)$$

$$D2 = S1 - S2 + S3 \quad (5-2)$$

$$D3 = S1 + S2 - S3 \quad (5-3)$$

$$D4 = S1 - S2 - S3 \quad (5-4)$$

A 4-to-4 Hadamard matrix HM, in which all elements are "1" or "−1" is chosen for the 4-to-4 K-muxing. A 4-to-4 K-muxing may be implemented by other orthogonal matrix such as Fourier transfer or any 4×4 full rank matrixes with realizable inversed matrixes. Equations (5-1) to (5-4) can be written in a matrix form as $$D = HM * S \quad (6)$$

where: $D = [D1, D2, D3, D4]^T \quad (6-1)$ $$HM = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (6-2)$$

$$S = [S1, S2, S3, 0]^T \quad (6-3)$$

Similarly to FIG. 1, the wavefront vector associated with the $k^{th}$ input port, Slice k, is referred to as $k^{th}$ WFV or WFVk. A WF vector specifies the distribution of a set of input data among the 4-output ports or among 4 aggregated output data sets, i.e. D1, D2, D3 and D4.

In general a 4-to-4 WF muxer, such as a device with function of the 4-to-4 K-muxing 130, features 4 orthogonal WFV's. Let us define a coefficient wjk of a Wavefront (WF) transform, or a K-transform performed by the 4-to-4 K-muxing 130 to be the coefficient at the $j^{th}$ row and $k^{th}$ column of the K-muxing 130. A WF vector of the 4-to-4 K-muxing 130 featuring a distribution among the 4 outputs, i.e. D1, D2, D3, and D4 at the 4 wavefront component (wfc) ports wfc1-wfc4, is defined as a 4-dimensional vector.

With 4 wfc ports in the 4-to-4 K-muxing 130, there shall be 4 mutually orthogonal WFVs. The first 3 WFVs are:

$$WFV1 = [w11, w21, w31, w41]^T \quad (7.1)$$

$$WFV2 = [w12, w22, w32, w42]^T \quad (7.2)$$

$$WFV3 = [w13, w23, w33, w43]^T \quad (7.3)$$

S1, S2, and S3 are "attached" to the 3 WF vectors by respectively connected to the first three input ports of the K-muxing 130. As a result, there is one remaining WFV, i.e. WFV4, which is not "utilized" in this illustration. All components of the 4 orthogonal WFVs are related to input and output port numbers or (spatial) sequences, but are independent from the input and output data sets.

Figure 2:
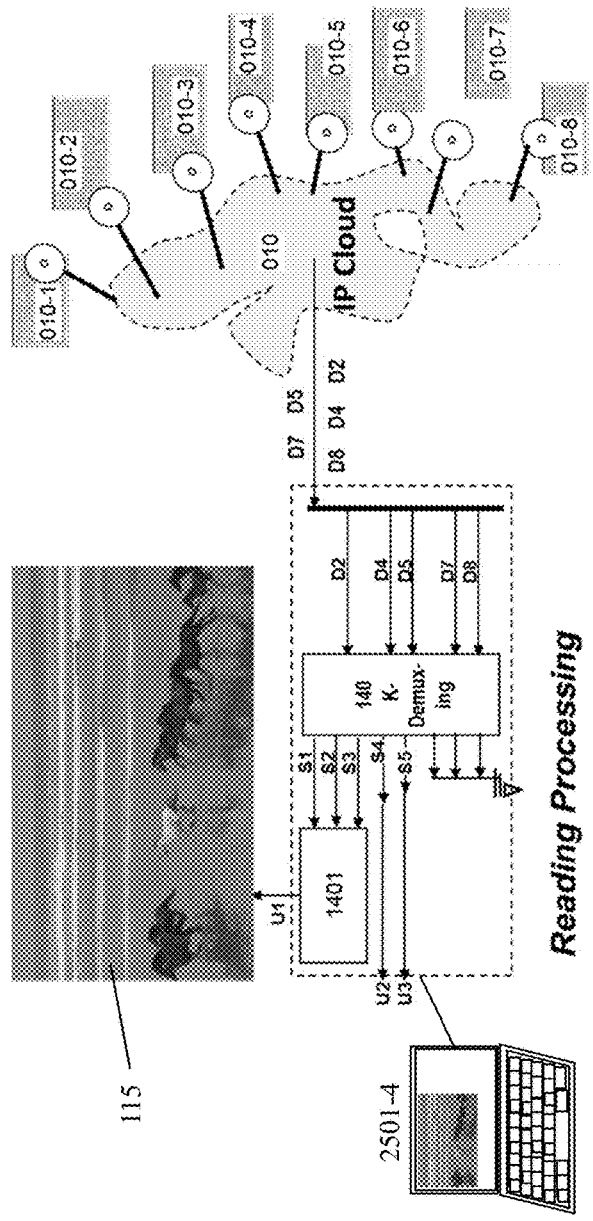
FIG. 2 depicts a block diagram on "reading" data from distributed data storage for 3 independent users U1, U2, and U3. Their data retrievals or reading processing from multiple (up to 8) stored data sets on cloud are via techniques of 8-to-8 Wavefront demuxing, also known as K-demuxing according to embodiments of the present disclosure. It is modified from FIG. 2B in the U.S. patent application publication No.: U.S.20140081989.

FIG. 2 depicts a corresponding reading process to the writing process in FIG. 1. The WF demultiplexing techniques via an 8-to-8 K-demuxing 140 may be used to retrieve 5 sets of data, i.e. S1, S2, S3, S4 and S5, from any subset of five data sets of the eight physically separated data storage sites 010-1 through 010-8 connected through IP Cloud 010. In this example the select subset comprises of D2, D4, D5, D7 and D8.

After the 8-to-8 K-demuxing 140, ideally the first three data sets, i.e. S1, S2, and S3, are to be de-segmented or combined into a large data set S(t) 115 by a de-segmentation processor 1401. The recovered data set S(t) 115 shall be substantially equivalent to the input data set S(t) 105 in FIG. 1.

Referring to FIG. 2, it shows the retrieval processing of the 5 recovered data. S1-S5 substantially equivalent to the input data sets S1-S5 respectively in FIG. 1, only when 5 stored data sets, i.e. D2, D4, D5, D7 and D8 substantially equivalent to the data sets D2, D4, D5, D7 and D8 respectively in FIG. 1, are accessible from five of the eight storage sites 010-1 through 010-8. Each of the outputs of the 8-to-8 K-demuxing 140 or retrieved data sets, S1-S5, is a linear combination of the 5 inputs D2, D4, D5, D7 and D8. The linear combination is a weighted sum of all 5 inputs; each weighted by a corresponding weighting parameter before a summing operation. Thus, each of the outputs or retrieved data sets S1-S5, contains information associated with all of the 5 inputs D2, D4, D5, D7 and D8. The retrieval process further includes the grouping of the first 3 retrieved data sets, i.e. S1, S2, and S3, into a large data set S(t) via a de-segmentation processor 1401. The retrieved data sets, i.e. S4 and S5, are substantially equivalent to the input data sets S4 and S5 respectively in FIG. 1.

When all 8 storage data sets become available, the 8-to-8 K-demuxing 140 can be efficiently implemented as a matrix inversion of the corresponding matrix for the 8-to 8 K-muxing 130 in FIG. 1. When K-muxing 130 implemented by a Hadamard matrix, the identical matrix can be used for efficient implementations for the K-demuxing 140.

No Redundancy K-muxing in a Mobile Device

Figure 3:
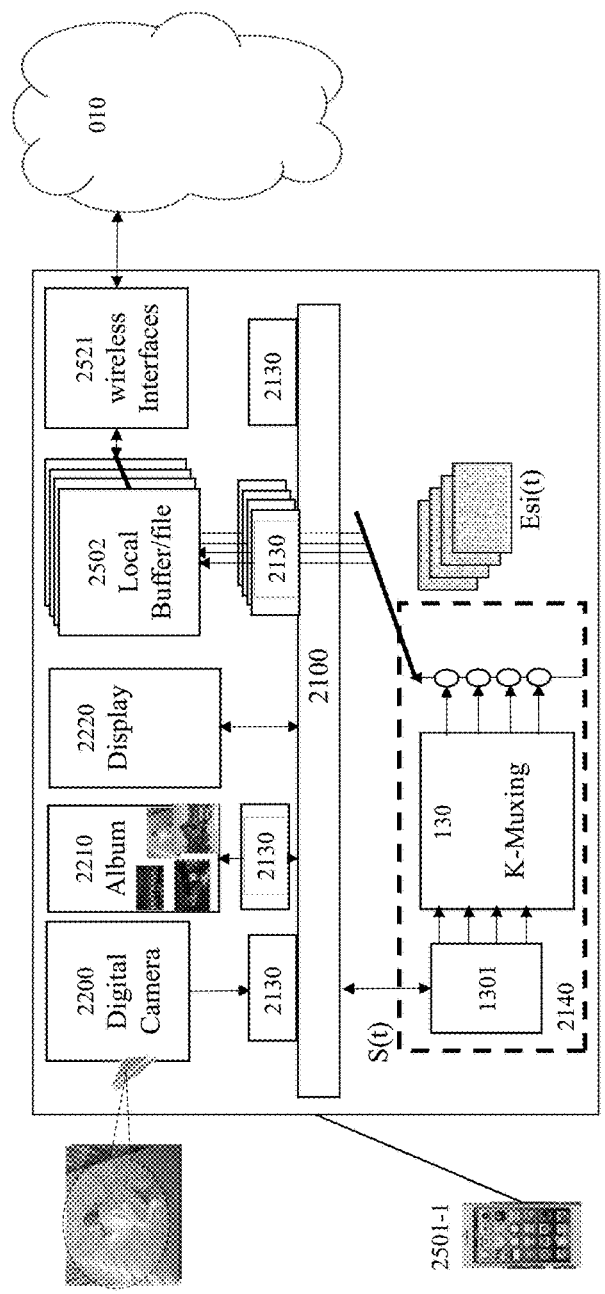
FIG. 3 depicts a block diagram of a data writing processing on distributed data storage on cloud for an image data set via techniques of 4-to-4 Wavefront muxing also known as K-muxing from a mobile device according to embodiments of the present disclosure. The cloud storage features data privacy but no redundancy.

FIG. 3 shows a software functional block diagram in a mobile device of K-muxing a data file for storage over distributed cloud storage without redundancy. The mobile device may be a smart phone 2501-1. A picture or a video S(t) taken by an embedded digital camera 2200 in real time or stored in the local album 2210 is sent to a pre-processing application 2140 via an application program interface (API) 2100, before sending the associated processed data sets to cloud 010 for storage through the API 2100 and then local buffers 2302. These various local buffers 2502 are individually associated with different software applications 2130, including local file synchronization management of cloud storage such as Dropbox, Google drive, iCloud, OneDrive, and others.

The picture or the real time video S(t) is taken from a baby in a crib. The API 2100, a set of routines, protocols, and tools for building software applications, specifies how software components should interact and APIs are used when programming graphical user interface (GUI) components. A good API makes it easier to develop a program by providing all the building blocks. A programmer then puts the blocks together.

The preprocessing application 2140 comprises of software for segmenting 1301 which functions as a 1-to-4 TDM de-multiplexing or demuxing operation and that for K-Muxing 130 which is implemented by a 4-to-4 Hadamard matrix. The 1-to-4 TDM demuxing 1301 shall convert the data string S(t) with a 4 R samples per second into four data sub-strings, each with a flowing rate of a R samples per second. These four data substrings are then connected to the 4 inputs of the K-muxing 130 implemented by a 4-to-4 Hadamard matrix. Its four output Esi (or Es1, Es2, Es3, and Es4) are then uploaded to cloud through local buffers 2502 of various cloud storage operators. It is likely the connectivity of a mobile device such as the smart phone 2501-1 to cloud 010 is through wireless interfaces 2521 supporting WiFi links, cell phone band links, and/or others. The mobile device may also be connected to cloud services via Ethernet (not shown) or other wired connectivity or through USB transports when these non-wireless connectivity is available at home in once office, or other public facilities.

No Redundancy K-demuxing in a Mobile Device

Figure 4:
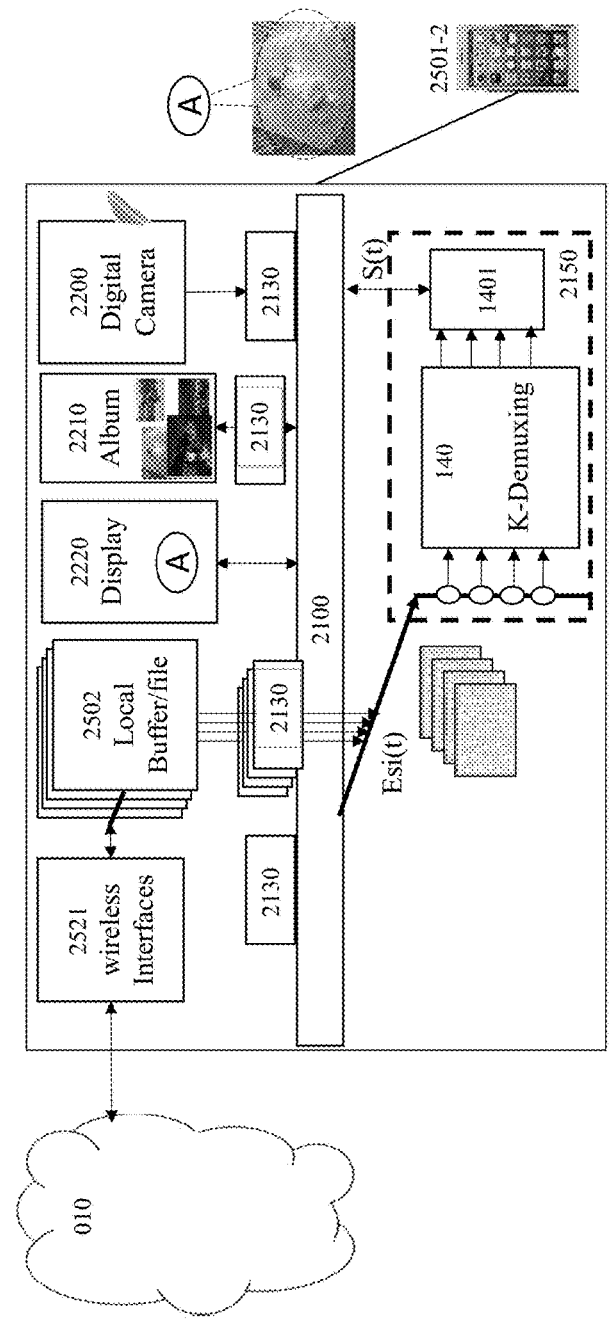
FIG. 4 depicts a block diagram of a data reading or retrieving processing from distributed data storage on cloud for an image data set via techniques of 4-to-4 Wavefront demuxing also known as K-demuxing in a mobile device according to embodiments of the present disclosure. The cloud storage features data privacy but no redundancy.

FIG. 4 shows a software functional block diagram in a mobile device for recovering stored pictures or videos by K-demuxing a set of muxed data substrings stored over distributed cloud storage without redundancy. The mobile device may be a smart phone 2501-2. Four sets of cloud stored substrings are requested and sent from cloud 010 to various local buffers 2502 via wireless interface 2521. Different applications 2300 associated the various local buffers 2502 include local file synchronization management of cloud storage such as Dropbox, Google drive, iCloud, OneDrive, and others. These retrieved muxed data substreams Esi(t) including Es1, Es2, Es3, and Es4 are sent through API 2100 to a post-processing application 2140 which shall recover the stored picture or a video data stream S(t).

The post-processing application 2150 comprises of software for a 4-to-4 K-demuxing 140 which is implemented by a 4-to-4 Hadamard matrix and that for segmenting 1301 which functions as a 4-to-1 TDM multiplexing or muxing operation.

The 4 inputs of the 4-to-4 K-demuxing 140 are connected to the retrieved muxed data substreams Esi(t) and the 4 outputs shall be the 4 recovered data substrings which are then connected to the function of de-segmenting 1401. The 1-to-4 TDM muxing 1401 shall convert the 4 recovered data substring S1, S2, S3, and S4; each with a R samples per second into a reconstituted data string with a flowing rate of a 4 R samples per second.

The reconstituted picture or video stream S(t) is then sent via the API 2100 for presentation by a display 2220 in the mobile device 2501-2. It may also be sent for local storage or buffering via various applications through the API 2100.

Cloud Data Storage/Recovery via K-Muxing/demuxing with No Redundancy

Figure 5:
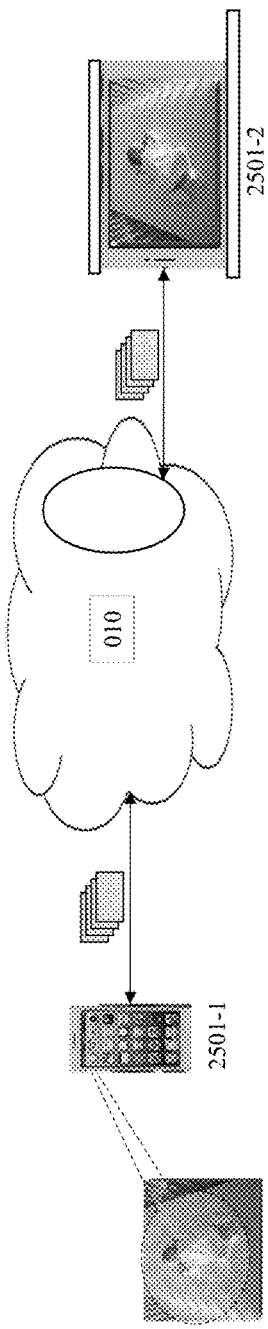
FIG. 5 depicts a block diagram of data writing on distributed data storage on cloud for an image and associated data reading processing in a mobile device via techniques of Wavefront muxing/demuxing, also known as K-muxing/ demuxing according to embodiments of the present disclosure. The cloud storage features data privacy but no redundancy.

FIG. 5 depict a top level functional block diagram for cloud storage techniques to use the memory space most efficiently for private data storage on cloud at the expense of survivability.

In a data storing or writing phase, an image or a (video) data stream in a first smart phone 2501-1 will be stored in distributed storages on cloud 010. The image has been preprocessed and become 4 processed segments or substreams before sent to the cloud 010.

In a data recovering or reading phase, a set of 4 processed segments or substreams stored on cloud shall be retrieved to a local post processor on a second smart phone 2501-2. The post processor on the second smart 2501-2 will reconstitute the image or the video data stream by process the retrieved set of all 4 processed segments or substreams.

The preprocessing comprises of K-muxing 130, and may also feature erasure coding and encryptions or similar functions before sending processed data to cloud. The corresponding post processing comprises of K-demuxing 140, and may also feature erasure-code decoding and decryptions or similar functions after retrieving all cloud-stored data from the cloud 010.

The first smart phone 2501-1 and the second smart phone 2501-2 may be two different phones. They may be a same phone in different time slots and/or at different locations K-Muxing with Redundancy in a Mobile Device FIG. 6 shows a software functional block diagram in a mobile device of K-muxing a data file for storage over distributed cloud storage with a 3 for 4 redundancy. The mobile device may be a smart phone 2501-1. A picture or a video S(t) taken by an embedded digital camera 2200 in real time or stored in the local album 2210 is sent to a pre-processing application 2140 via an application program interface (API) 2100, before sending the associated processed data sets to cloud 010 for storage through the API 2100 and then local buffers 2302. These various local buffers 2502 are individually associated with different software applications 2130, including local file synchronization management of cloud storage such as Dropbox, Google drive, iCloud, OneDrive, and others.

The picture or the real time video S(t) is taken from a baby in a crib. The API 2100, a set of routines, protocols, and tools for building software applications, specifies how software components should interact and APIs are used when programming graphical user interface (GUI) components. A good API makes it easier to develop a program by providing all the building blocks. A programmer then puts the blocks together.

The preprocessing application 2140 comprises of software for segmenting 1301 which functions as a 1-to-3 TDM de-multiplexing or demuxing operation and that for K-Muxing 130 which is implemented by a 4-to-4 Hadamard matrix. The 1-to-3 TDM demuxing 1301 shall convert the data string S(t) with a 3 R samples per second into three data sub-streams, each with a flowing rate of a R samples per second. These three data substrings are then connected to 3 of the 4 inputs of the K-muxing 130 implemented by a 4-to-4 Hadamard matrix. The remaining $4^{th}$ input is grounded as shown, connected to a known constant, or fed by a known digital file. Its four outputs Esi (or Es1, Es2, Es3, and Es4) are then uploaded to cloud through local buffers 2502 of various cloud storage operators. It is likely the connectivity of a mobile device such as the smart phone 2501-1 to cloud 010 is through wireless interfaces 2521 supporting WiFi links, cell phone band links, and/or others. The mobile device may also be connected to cloud services via Ethernet (not shown) or other wired connectivity or through USB transports when these non-wireless connectivity is available at home in once office, or other public facilities.

K-demuxing with Redundancy in a Mobile Device

FIG. 7 shows a software functional block diagram in a mobile device for recovering stored pictures or videos by K-demuxing a set of muxed data substrings stored over distributed cloud storage with a 3 for 4 redundancy. The mobile device may be a smart phone 2501-2. Four sets of cloud stored substreams are requested and sent from cloud 010 to various local buffers 2502 via wireless interface 2521. Different applications 2300 associated the various local buffers 2502 include local file synchronization management of cloud storage such as Dropbox, Google drive, iCloud, OneDrive, and others. WE only need 3 out of the 4 stored data substrings. These retrieved muxed data substrings Esi(t) including Es1, Es2, Es3, and/or Es4 are sent through API 2100 to a post-processing application 2150 which shall recover the stored picture or a video data stream S(t).

The post-processing application 2150 comprises of software for a 4-to-4 K-demuxing 140 which is implemented by a 4-to-4 Hadamard matrix and that for de-segmenting 1401 which functions as a 3-to-1 TDM multiplexing or muxing operation.

The 4 inputs of the 4-to-4 K-demuxing 140 are connected to any three of the 4 retrieved muxed data substrings Esi(t) and the 4 outputs shall be a known output and the 3 recovered data substrings which are then connected to the de-segmenting processor 1401. The 1-to-3 TDM muxing for the de-segmenting 1401 shall convert the 3 recovered data substrings S1, S2, and S3; each with a R samples per second into a reconstituted data stream with a flowing rate of a 3 R samples per second.

The reconstituted picture or video stream S(t) is then sent via the API 2100 for presentation by a display 2220 in the mobile device 2501-2. The reconstituted picture or video stream S(t), a video clip on wildlife, may also be sent for local storage or buffering via various applications through the API 2100.

Cloud Data Storage/Recovery with 3 for 4 Redundancy

FIG. 8 depict a top level functional block diagram for cloud storage techniques for private data storage on cloud with survivability.

In a data storing or writing phase, an image or a (video) data stream in a first smart phone 2501-1 will be stored in distributed storages on cloud 010. The image has been preprocessed and become 4 processed segments or sub-streams before sent to the cloud 010.

In a data recovering or reading phase, a set of any 3 from the 4 processed segments or substreams stored on cloud shall be retrieved to a local post processor on a second smart phone 2501-2. The post processor on the second smart 2501-2 will reconstitute the image or the video data stream by processing the retrieved set of all 3 from the 4 processed segments or substreams.

The preprocessing comprises of K-muxing 130, and may also feature erasure coding and encryptions or similar functions before sending processed data to cloud. The corresponding post processing comprises of K-demuxing 140, and may also feature erasure-code decoding and decryptions or similar functions after retrieving all cloud-stored data from the cloud 010.

It is important to point out that cloud stored data preprocessed by the K-muxing in FIG. 3 will not be useful at all for a post processing of the K-demuxing depicted in FIG. 7. Similarly, cloud stored data preprocessed by the K-muxing in FIG. 6 will not be useful at all for a post processing of the K-demuxing depicted in FIG. 4. It is noticed that the functions of the K-muxing 130 in FIG. 3 and that in FIG. 6 are identical and featuring a 4-to-4 Hadamard transform. Similarly, the functions of K-demuxing 140 in FIG. 4 and those in FIG. 7 also feature the same 4-to-4 Hadamard transform.

This is because the 4 data inputs to the K-muxing 130 in FIG. 3 are very different from those in FIG. 6. The former features a set of 4 data segments or data substrings in FIG. 3 while only 3 data segments or 3 data substrings are connected to 3 of the 4 inputs of the K-muxing 130 in FIG. 6. The remaining last input is connected not to data to be stored but to one known input signal. In fact the remaining input is grounded, effectively connected to a known signal always set at zero value.

On the other hand, FIG. 9 depicts an operation of using fixed PCs or a locatable notebook 2501-3 to upload to cloud an image S(t) or a data stream via 4 processed data sets (Esi where i=1 to 4). It also shows operations of using portable or moving devices such as a smart phone 2501-2 to connect to the cloud 010 and to reconstitute the uploaded image S(t) or data streams in various locations at a later time slot through any 3 out of the 4 cloud-stored processed data sets (Esi, where i=1, 2, 3, and 4).

On the left, the depicted writing processing in the notebook 2501-3 features a pre-processing to segment an input image S(t) 105 or a data stream into 3 segments or data substrings S1, S2, and S3 by a segmenting processor 1301 first. A K-muxing 130 featuring 4 inputs and 4 outputs transform the 4 inputs including the 3 segments or the 3 data substrings and a known signal as the $4^{th}$ input to a set of 4 K-muxed outputs; Esi(t) where i=1, 2, 3, and 4. The port connected to the $4^{th}$ input depicted in here is grounded. As a result, the $4^{th}$ signal is a stream of constant of samples with a value of "zero." The $4^{th}$ input may also be connected to a known constant or a known data stream.

The stored data sets on cloud are processed data sets (Esi, where i=1, 2, 3, and 4) from a 4-to-4 K-muxing process. Each of these 4 file is a result of aggregation of the 3 segments; S1, S2, and S3. The aggregation process features a sample-by-sample operation with each output sample as numerically weighted summing of all 3 corresponding input samples from the three segments; S1, S2, and S3. As a result, the outputs from a single K-muxed data set are un-intelligible. The sufficient conditions to reconstruct original data set will always require a minimum of 3 from the 4 K-muxed data set.

Furthermore, it is notice that there are 24 connectivity combinations between 4 input ports and 4 input signals. For any 4-to-4 K-muxing processor with same set of the 4 input signals, every one of the 24 combinations will result to a unique set of Esi; where i=1, 2, 3, and 4. Without the information in a K-demuxing operation, it will be difficult to reconstruct the original data set S(t) even we have retrieved from cloud all 4 stored K-muxed data sets (Esi; where i=1, 2, 3, and 4). The connectivity and other configuration information as well as configuration combinations shall be one of the important items in a registry for configuration management. Other configurations may include between 4 outputs of a K-muxing and accessable multiple storages on cloud including those on private cloud and other private local storages connected by IP networks.

On the right side of FIG. 9, the depicted reading processing in the smart phone 2501-2 features a software functional block diagram in a mobile device for recovering stored pictures or videos by K-demuxing a set of muxed data substrings stored over distributed cloud storage with a 3 for 4 redundancy. The mobile device is a smart phone 2501-2. Four sets of cloud stored substreams are requested and sent from cloud 010 to various local buffers 2502 via wireless interface 2521. Different applications associated with the various local buffers 2502 include local file synchronization management of cloud storage such as Dropbox, Google drive, iCloud, OneDrive, and others. Only 3 out of the 4 stored muxed data substrings (Esi; where i=1, 2, 3, and 4) are required. The retrieved muxed data substrings Esi(t) including Es1, Es2, Es3, and/or Es4 are sent through API 2100 to a post-processing application 2150 which shall recover the stored picture or a video data stream S(t).

The post-processing application 2150 comprises of software for a 4-to-4 K-demuxing 140 which is implemented by a 4-to-4 Hadamard matrix and that for a de-segmenting processor 1401 which functions as a 3-to-1 TDM multiplexing or muxing operation.

The 4 inputs of the 4-to-4 K-demuxing 140 are connected to any three of the 4 retrieved muxed data substrings Esi(t) and the 4 outputs shall be a known output and the 3 recovered data substrings which are then connected to the de-segmenting processor 1401. A 1-to-3 TDM muxing shall convert the 3 recovered data substrings S1, S2, and S3; each with a R samples per second into a reconstituted data stream with a flowing rate of a 3 R samples per second.

The reconstituted picture or video stream S(t) is then sent via the API 2100 for presentation by a display 2220 in the smart phone 2501-2. The reconstituted picture or video stream S(t) may also be sent for local storage or buffering via various applications through the API 2100. S(t) in this example is a short video clip on wildlife.

FIG. 9A depicts a simplified version of the functional block diagram in FIG. 9. It shows an operation of using fixed PCs or a locatable notebook 2501-3 to upload to cloud an image S(t) or a data stream via 4 processed data sets (Esi where i=1 to 4). It also shows operations of using portable or moving devices such as a smart phone 2501-2 to connect to the cloud 010 and to reconstitute the uploaded image S(t) or data streams in various locations at a later time slot through any 3 out of the 4 cloud-stored processed data sets (Esi, where i=1,2,3,and 4). S(t) is a video clip on wild life.

FIG. 9B depicts a functional block diagram with a reversed flowing direction from that in FIG. 9A. It shows an operation of using moving devices such as a smart phone 2501-2 to upload to cloud an image S(t) or a data stream via 4 processed data sets (Esi where i=1 to 4). It also shows operations of using fixed PCs or a locatable notebook 2501-3 to connect to the cloud 010 and to reconstitute the uploaded image S(t) or data streams in various fixed locations at a later time slot through any 3 out of the 4 cloud-stored processed data sets (Esi, where i=1,2,3,and 4). S(t) is a video clip on wild life.

Multiple Files Cloud Data Storage/Recovery with 3 for 4 Redundancy

FIG. 10 depicts a similar functional block diagram as that in FIG. 9. The key difference is that the 3 inputs, S1, S2, and S3, to the K-muxing 130 are three independent data files or pictures instead of 3 segments from a data file or picture. As an example, 3 short video clips are selected as the 3 inputs. S1(t), the first of the three inputs, features a clip of wildlife, the second input S2 a clip of a musical recital, and the third one S3(t) a video recording on a trip to China countryside.

In a data storing or writing phase, the three video data streams in a notebook 2501-3 will be stored in distributed storages on cloud 010. These inputs have been preprocessed and become 4 processed streams before sent to the cloud 010. Each of selected storage sites may only store one of the four processed streams, which is a linear combination of all 3 input streams and shall become unintelligible by itself. Furthermore, any one of the three inputs are stored in all 4 cloud storage. As a result, the cloud storages are shared by the three inputs of video data streams In a data recovering or reading phase, a set of any 3 from the 4 processed data streams stored on cloud shall be retrieved to a local post processor on a second smart phone 2501-2. A K-demuxing 140 in a post processor on the second smart 2501-2 may be commanded to reconstitute only one of three video data streams. The K-demuxing 140 may also be commanded to recover all three original videos by processing the retrieved set of all 3 from the 4 stored processed data streams. A dispatching device 1403 may send one of them to a display 2220 and two remaining ones to local buffers or memory via API 2100 for later reviews.

FIG. 10A depicts a simplified functional block diagram as that in FIG. 10 but with more users to view different stored original data streams. The 3 original inputs, S1, S2, and S3 are 3 independent short video clips. S1(t) features a clip of wildlife, S2(t) a clip on a musical recital, and S3(t) a video recording on a trip to China countryside.

The data recording or writing process is identical to that in FIG. 10.

There are three reading users, one with a second smart phone 2501-2, the other two with a $3^{rd}$ smart phone 2501-4 and a $4^{th}$ phone 2501-6. In a data recovering or reading phase, a set of any 3 from the 4 processed data streams stored on cloud shall be retrieved to a local post processor on a second smart phone 2501-2. A K-demuxing 140 in a post processor on the second smart 2501-2 is commanded to reconstitute only the S1(t) the $1^{st}$ video data streams. Similarly in data reading phases for the $3^{rd}$ and $4^{th}$ smart phones 2501-4 and 2501-6, any 3 from the 4 processed data streams stored on cloud shall be retrieved to a local post processor on a smart phone. The K-demuxing 140 in a post processor on the $3^{rd}$ msmart 2501-4 is commanded to reconstitute only the S2(t) the $2^{nd}$ video data streams while that on the $4^{th}$ smart 2501-6 is commanded to reconstitute only the S3(t) the $3^{rd}$ video data streams.

K-muxing with Enhanced Redundancy in a Mobile Device

FIG. 11 shows a software functional block diagram in a mobile device of K-muxing a data file for storage over distributed cloud storage with a 2 for 4 redundancy. The mobile device may be a smart phone 2501-1. A picture or a video S(t) taken by an embedded digital camera 2200 in real time or stored in the local album 2210 is sent to a pre-processing application 2140 via an application program interface (API) 2100, before sending the associated processed data sets to cloud 010 for storage through the API 2100 and then local buffers 2302. These various local buffers 2502 are individually associated with different software applications 2130, including local file synchronization management of cloud storage such as Dropbox, Google drive, iCloud, OneDrive, and others.

The picture or the real time video S(t) is taken from a scene with a baby in a crib. The API 2100, a set of routines, protocols, and tools for building software applications, specifies how software components should interact and APIs are used when programming graphical user interface (GUI) components. A good API makes it easier to develop a program by providing all the building blocks. A programmer then puts the blocks together.

The preprocessing application 2140 comprises of software for segmenting 1301 which functions as a 1-to-2 TDM de-multiplexing or demuxing operation and that for K-Muxing 130 which is implemented by a 4-to-4 Hadamard matrix. The 1-to-2 TDM demuxing 1301 shall convert the data string S(t) with a 2 R samples per second into two data sub-streams, each with a flowing rate of a R samples per second. These two data substrings are then connected to 2 of the 4 inputs of the K-muxing 130 implemented by a 4-to-4 Hadamard matrix. The remaining $3^{rd}$ and $4^{th}$ inputs are grounded as shown, connected to known constants, or fed by a known digital file. Its four outputs Esi (or Es1, Es2, Es3, and Es4) are then uploaded to cloud through local buffers 2502 of various cloud storage operators. It is likely the connectivity of a mobile device such as the smart phone 2501-1 to cloud 010 is through wireless interfaces 2521 supporting WiFi links, cell phone band links, and/or others. The mobile device may also be connected to cloud services via Ethernet (not shown) or other wired connectivity or through USB transports when these non-wireless connectivity is available at home in once office, or other public facilities.

However, if a Hadamard matrix is used for the K-muxing 130 in a preprocessor, one method for generating more efficient redundancy is to follow a formulation similar to the one illustrated in equations (1-1a) to (1-8a). In a pre-storage processing, the 4-to-4 K muxing 130 is used to convert 2 sets of input data, i.e. S1(t), and S2(t) to 4 sets of output data, i.e. D1, D2, D3, and D4, where:

$$D1=S1(t)+S2(t)+f1(t)+f2(t) \quad (8\text{-}1)$$

$$D2=S1(t) \; S2(t)+f1(t)-f2(t) \quad (8\text{-}2)$$

$$D3=S1(t)+S2(t)-f1(t)-f2(t) \quad (8\text{-}3)$$

$$D4=S1(t)S2(t)-f1(t)+f2(t) \quad (8\text{-}4)$$

A 4-to-4 Hadamard matrix HM, in which all elements are "1" or "−1" is chosen for the 4-to-4 K-muxing. A 4-to-4 K-muxing may be implemented by other orthogonal matrix such as Fourier transfer or any 4×4 full rank matrixes with realizable inversed matrixes. Equations (8-1) to (8-4) can be written in a matrix form as $$D=HM*S \quad (6)$$

where: $D=[D1, D2, D3, D4]^T \quad (6\text{-}1)$ $$HM = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (6\text{-}2)$$

$$S = [S1(t), S2(t), f1(t), f2(t)]^T \quad (8\text{-}5)$$

We may choose many sets of functions which are related to both S(t) and S(t). The following choice appears to work well;

$$f1=S1+2*S2+0 \quad (9a)$$

$$f2=0 \quad (9b)$$

K-Demuxing with Enhanced Redundancy in a Mobile Device

FIG. 12 shows a software functional block diagram in a mobile device for recovering stored pictures, videos, or digital streams by K-demuxing a set of muxed data substreams stored over distributed cloud storage with a 2 for 4 redundancy. The mobile device may be a smart phone 2501-2. Four sets of cloud stored substreams are requested and sent from cloud 010 to various local buffers 2502 via wireless interface 2521. Different applications 2300 associated the various local buffers 2502 include local file synchronization management of cloud storage such as Dropbox, Google drive, iCloud, OneDrive, and others. WE only need 3 out of the 4 stored data substreams. These retrieved muxed data substreams Esi(t) including Es1, Es2, Es3, and/or Es4 are sent through API 2100 to a post-processing application 2150 which shall recover the stored picture or a video data stream S(t).

The post-processing application 2150 comprises of software for a 4-to-4 K-demuxing 140 which is implemented by a 4-to-4 Hadamard matrix and that for de-segmenting 1401 which functions as a 2-to-1 TDM multiplexing or muxing operation.

When all 4 inputs of the 4-to-4 K-demuxing 140 are connected to 4 retrieved muxed data substreams Esi(t) and the 4 outputs shall be two known outputs and the 2 recovered data substreams which are then connected to the de-segmenting processor 1401. The 1-to-2 TDM muxing for the de-segmenting 1401 shall convert the 2 recovered data substreams S1, and S2; each with a R samples per second into a reconstituted data stream with a flowing rate of a 2 R samples per second.

On the other hand, when 2 of 4 inputs of the 4-to-4 K-demuxing 140 are connected to only 2 retrieved muxed data substreams Esi(t), say Es1(t) and Es3(t) only, and the 2 outputs from the K-demuxing 140 shall be the 2 recovered data substreams which are then connected to the de-segmenting processor 1401. The 1-to-2 TDM muxing for the de-segmenting 1401 shall convert the 2 recovered data substreams S1, and S2; each with a R samples per second into a reconstituted data stream with a flowing rate of a 2 R samples per second. For an advanced subscriber, the recovered S1(t) and S2(t) shall be used to regenerate Es2(t) and Es4(t) and then to request for updating the previously unavailable data stored on cloud.

The reconstituted picture or video stream S(t) is then sent via the API 2100 for presentation by a display 2220 in the mobile device 2501-2. The reconstituted picture, video stream, or digital stream S(t), a video clip on wildlife, may also be sent for local storage or buffering via various applications through the API 2100.

Cloud Data Storage/Recovery with 2 for 4 Redundancy

FIG. 13 depict a top level functional block diagram for cloud storage techniques for private data storage on cloud with survivability. In a data storing or writing phase, an image or a (video) data stream in a first smart phone 2501-1 will be sent and stored in distributed storages on cloud 010. The image has been preprocessed and becomes 4 processed segments or substreams before being sent to the cloud 010.

In a data recovering or reading phase, a set of any 2 from the 4 processed segments or substreams stored on cloud shall be retrieved to a local post processor on a second smart phone 2501-2. The post processor on the second smart 2501-2 will reconstitute the image or the video data stream by processing the retrieved any set of 2 from the 4 processed segments or substreams.

The preprocessing comprises of K-muxing 130, and may also feature erasure coding and encryptions or similar functions before sending processed data to cloud. The corresponding post processing comprises of K-demuxing 140, and may also feature erasure-code decoding and decryptions or similar functions after retrieving all cloud-stored data from the cloud 010.

It is important to point out that cloud stored data preprocessed by the K-muxing in FIG. 3 or that in FIG. 6 will not be useful at all for a post processing of the K-demuxing depicted in FIG. 12 or in here. Similarly, cloud stored data preprocessed by the K-muxing in FIG. 12 or here will not be useful at all for a post processing of the K-demuxing depicted in FIG. 4 and that in FIG. 7. It is noticed that the functions of the K-muxing 130 in FIG. 3, FIG. 6, FIG. 11, and that in here are identical and featuring a 4-to-4 Hadamard transform. Similarly, the functions of K-demuxing 140 in FIG. 4, FIG. 7, FIG. 12 and here also feature the same 4-to-4 Hadamard transform.

This is because the 4 data inputs to the K-muxing 130 in FIG. 3 are very different from those in FIG. 6, FIG. 11, or here. The former features a set of 4 data segments or data substreams in FIG. 3 while only 3 or 2 data segments are connected to 3 or 2 of the 4 inputs of the K-muxing 130 in FIG. 6 or FIG. 1. In many configurations, the remaining last inputs are connected not to data to be stored but to one known input signal. In fact the remaining input is grounded, effectively connected to a known signal always set at zero value.

FIG. 13A depict a top level functional block diagram for cloud storage techniques for private data storage on cloud with enhanced survivability and is a simplified version of FIG. 13. In a data storing or writing phase, an image or a (video) data stream in a first smart phone 2501-1 will be stored in distributed storages on cloud 010. The image has been preprocessed and become 4 processed segments or substreams before being sent to the cloud 010. The preprocessing features two operations; (1) segmenting an input data set or a data stream into two data segments or 2 data substreams, and then coverting the two inputs via a K-muxing into 4 WF muxed files for storage on cloud.

In a data recovering or reading phase, a set of any 2 from the 4 processed segments or substreams stored on cloud shall be retrieved to a local post processor on a second smart phone 2501-2. The post processor on the second smart 2501-2 will reconstitute the image or the video data stream by processing the retrieved set of all 2 from the 4 processed segments or substreams.

A first smart phone 2501-1 and a $2^{nd}$ mart phone 2501-2 may be the same smart phone but referred to in different time slots

K-muxing via Erasure Code

K-muxing of data storage techniques feature enhanced privacy and survivability via redundancy for stored data. For many applications for big data storage, data survivability is a key important criteria while data privacy is not as critical. Let us assume that a stored data set with total of N files comprise of N-P primary files and P redundant files or parity files. In these applications, the original inputs to a K-muxing transform will be used as primary files in a stored data set and corresponding outputs from the K-muxing may be selected as redundant files or parity files of the stored data set. As an example, a big data file S is segmented into 8 segments (S1 to S8), which are connected to a 8-to-8 K-muxing transformation with 8-outputs (Y1 to Y8). The segmented data files (S1 to S8) will be used as primary files in a storage data set, while redundant or parity files of the stored data set may be selected from the 8 outputs (Y1 to Y8). The 8-to-8 K-muxing provides 8 additional parity files, in which we may choose 2 only for some applications supporting a 1.25× total storage constraint but with limited survivability protection. For other applications with enhanced survivability which need a 2× storage, we may take all 8 outputs as a set of parity files.

In general, most of K-muxing transforms are linear processing while most of erasure coding (EC) are not. However, when keeping |X|=1 in EC polynomials, the selected EC process can be made to function as linear processing. We are exploring unique features in the overlapped domain of K-muxing and EC in this section.

Storage technology, RAID, uses checksums or mirroring to protect data, and spreads the data and checksums across a group of disks referred to as a RAID volume. Using available terabyte disk drives, it's common to manage data sets on a single, consistent logical RAID volume of 4-12 drives with a total usable capacity of about 30 terabytes. RAID slices data into a fixed number of data blocks and checksums, and writes each chunk or checksum onto an independent disk in the volume. However, higher capacity disks used to build these large RAID volumes for digital libraries with high-resolution content also dramatically lengthen the rebuild time when failures occur. In addition, dual and triple parity RAID can mitigate the risk of data corruption, but adding additional parity checks is costly and reduces RAID performance, so it's less and less attractive as the storage scales. Furthermore without replication, RAID offers limited protection against node-level failures, and no protection against site-level disasters. But it's expensive. It doubles the amount of storage required, requires expensive high-bandwidth networking between the sites, and introduces new operational complexities to ensure the replication is performing properly or to keep both sites accurately synchronized.

On the other hand, erasure code algorithms were developed decades ago to ensure transmission integrity of streaming data for space communications. In information theory, an erasure code is a forward error correction (FEC) code for the binary erasure channel, which transforms a message of k symbols into a longer message (code word) with n symbols such that the original message can be recovered from a subset of the n symbols. The fraction r=k/n is called the code rate, the fraction k'/k, where k' denotes the number of symbols required for recovery, is called reception efficiency.

Optimal erasure codes have the property that any k out of the n code word symbols are sufficient to recover the original message (i.e., they have optimal reception efficiency). Optimal erasure codes are maximum distance separable codes (MDS codes). Optimal codes are often costly (in terms of memory usage, CPU time, or both) when n is large. Except for very simple schemes, practical solutions usually have quadratic encoding and decoding complexity.

Erasure coding transforms data objects into a series of codes. Each code contains the equivalent of both data and checksum redundancy. The codes are then dispersed across a large pool of storage devices, which can be independent disks, independent network-attached storage nodes, or any other storage medium. While each of the codes is unique, a random subset of the codes can be used to retrieve the data. The erasure code algorithms that spread the data to protect it also make upgrading to new storage technologies simpler. When drives fail, the object storage redistributes the protection codes without having to replace disks and without degrading user performance. Administrators are now free to schedule drive replacement at their convenience, and are free to upgrade to larger disk sizes. Unlike RAID, codes can be spread across racks or geographically dispersed sites without replication, allowing erasure coding to protect from disk, node, rack, or even site failures all on the same scalable system. The algorithms can also apply different durability policies within the same object storage so that critical data can be given greater data protection without segregating it at the hardware level.

ReedSolomon codes are an important group of error-correcting codes. They have many important applications, the most prominent of which include consumer technologies such as CDs, DVDs, Blu-ray Discs, QR Codes, data transmission technologies such as DSL and WiMAX, broadcast systems such as DVB and ATSC, and storage systems such as RAID 6. They are also used in satellite communication. In coding theory, the Reed-Solomon code belongs to the class of non-binary cyclic error-correcting codes. The Reed-Solomon code is based on univariate polynomials over finite fields. It is able to detect and correct multiple symbol errors. By adding t check symbols to the data, a Reed-Solomon code can detect any combination of up to t erroneous symbols, or correct up to [t/2] symbols. As an erasure code, it can correct up to t known erasures, or it can detect and correct combinations of errors and erasures. Furthermore, Reed-Solomon codes are suitable as multiple-burst bit-error correcting codes, since a sequence of b+1 consecutive bit errors can affect at most two symbols of size b. The choice of t is up to the designer of the code, and may be selected within wide limits.

In big-data storage RS codes as optimum erasure codes have been used for better survivability via redundancy. FIG. 14 depicts a block diagram using a polynomial 128 for RS code of, as a version k-muxing 130 among 4 photo files.

$$Y(X) = A_0 + A_1 X + A_2 X^2 + A_3 X^3 \tag{10}$$

where

[$A_0$] are inputs for pixels of S0 which are converted as a pixel stream S0(t),

[$A_1$] are inputs for pixels of S1 which are converted as a pixel stream S1(t),

[$A_2$] are inputs for pixels of S2 which are converted as a pixel stream S2(t),

[$A_3$] are inputs for pixels of S3 which are converted as a pixel stream S3(t),

[$A_0, A_1, A_2, A_3$] are the 4 inputs 1302 of a K-muxing 130.

In fact over the finite field of selected X variables, $X \in \{X1, X2, X3, X4\}$, $X^4$ always equals to 1. Thus Equation 10 can be re-written as $$Y(X) = A_1 X + A_2 X^2 + A_3 X^3 + A_4 X^4 \tag{10a}$$

and $A_4 = A_0$.

In addition, each of the four pictures with pixels in real number is segmented into two groups, S1=[S11, S12], S2=[S21, S22], S3=[S31, S32], S0=[S01, S02]. As an example when S1 is a picture with 8 M-pixels; then each of S11 and S12 features 4 M pixels. A first input to the RS polynomial 128, [$A_1$], mathematically features a stream of complex number with intensity of a pixel in S11 as the real part and intensity of a corresponding pixel in S12 as the imaginary part; or the nth sample of the $A_1$ stream is represented as $A_1(n) = S11(n) + j\, S12(n)$; or simply Similarly, $$A_1 = S11 + j\, S12 \tag{10-1}$$

$$A_2 = S21 + j\, S22 \tag{10-2}$$

$$A_3 = S31 + j\, S32 \tag{10-3}$$

$$A_0 = S01 + j\, S02 \tag{10-4}$$

Furthermore, we extend a finite field for the polynomial of variable X over a unity circle in a complex plane. X varies among the 4 points of a unity circle over a complex plane, and X1=1+j 0, X2=0+j 1, X3=−1+j 0, X4=0−j 1. Thus the outputs of the polynomial 128 at the 4 different Xs (X=X1, X=X2, X=X3, and X=X4) are written as $$Y(X1) = Y(1) = A_0 + A_1 + A_2 + A_3 \tag{11a}$$

$$Y(X2) = Y(j) = A_0 + jA_1 - A_2 - jA_3 \tag{11b}$$

$$Y(X3) = Y(-1) = A_0 - A_1 + A - A_3 \tag{11c}$$

$$Y(X4) = Y(j) = A_0 - jA_1 - A_2 + jA_3 \tag{11d}$$

Using the terminologies of wavefront multiplexing (WF muxing) for the K-muxing 130, the 4 data streams $A_0, A_1, A_2, A_3$ of the 4 inputs 1302 are, respectively, distributed over the 4 selected output files 1304 with different sets of weighting components. Each distributed set over the four outputs 1304 corresponds to one of the 4 inputs 1302 is referred as a wavefront characterized by a wavefront vector (WFV). The 4 WFVs are WFV0 for input data stream $A_0$, WFV1 for data stream $A_1$, WFV2 for data stream $A_2$, WFV3 for data stream $A_3$, where $$WFV0 = [1, 1, 1, 1]^T, \tag{11-1}$$

$$WFV1 = [1, j, -1, -j]^T, \tag{11-2}$$

$$WFV2 = [1, -1, 1, -1]^T, \tag{11-3}$$

$$WFV3 = [1, -j, -1, j]^T, \tag{11-4}$$

It is noticed that equations (11a), (11b), (11c), and (11d) are formulations for a 4-to-4 FFT. When the polynomial 128 becomes a mechanism generating 4-point FFT between the domain of [A's] to the domain of [Y's] when the 4 sampling points of X in a complex plane (or a I-Q plane) are chosen to be at X=Xi where i=1 to 4; and X1=1+j 0, X2=0+j 1, X3=−1+j 0, and X4=0−j 1.

The four outputs 1304 feature 4 sample streams of complexed number or 8 real sample streams;

$$Y(1) = Y1r + j\, Y1q \tag{12a}$$

$$Y(j) = Y2r + j\, Y2q \tag{12b}$$

$$Y(-1) = Y3r + j\, Y3q \tag{12c}$$

$$Y(-j) = Y4r + j\, Y4q \tag{12d}$$

and $$Y1r = S01 + S11 + S21 + S31 \tag{12a-1}$$

$$Y1q = S02 + S12 + S22 + S32 \tag{12a-2}$$

$$Y2r = S01 - S12 - S21 + S32 \quad (12\text{b-}1)$$

$$Y2q = S02 + S11 - S22 - S31 \quad (12\text{b-}2)$$

$$Y3r = S01 - S11 + S21 - S31 \quad (12\text{c-}1)$$

$$Y3q = S02 - S12 + S22 - S32 \quad (12\text{c-}2)$$

$$Y4r = S01 + S12 - S21 - S32 \quad (12\text{d-}1)$$

$$Y4q = S02 - S11 - S22 + S31 \quad (12\text{d-}2)$$

Equations (12a) to (12d) and equations (12a-10) to (12D-2) can be written in form of a matrix as that in equation (13).

$$\begin{bmatrix} Y1r \\ Y1q \\ Y2r \\ Y2q \\ Y3r \\ Y3q \\ Y4r \\ Y4q \end{bmatrix} = \begin{bmatrix} 1 & 0 & 1 & 0 & 1 & 0 & 1 & 0 \\ 0 & 1 & 0 & 1 & 0 & 1 & 0 & 1 \\ 1 & 0 & 0 & -1 & -1 & 0 & 0 & 1 \\ 0 & 1 & 1 & 0 & 0 & -1 & -1 & 0 \\ 1 & 0 & -1 & 0 & 1 & 0 & -1 & 0 \\ 0 & 1 & 0 & -1 & 0 & 1 & 0 & -1 \\ 1 & 0 & 0 & 1 & -1 & 0 & 0 & -1 \\ 0 & 1 & -1 & 0 & 0 & -1 & 1 & 0 \end{bmatrix} \begin{bmatrix} S01 \\ S02 \\ S11 \\ S12 \\ S21 \\ S22 \\ S31 \\ S32 \end{bmatrix} \quad (13)$$

In reconstructing S0 to S3, there are 8 unknown (S01 to S32) with 8 equations relating 8 Y's (stored data files) and 8 S's (segmented substreams from an original information data). There are no redundancy in FIG. 14 for the stored data while using conventional K-muxing methods featuring data privacy. In order to reconstruct the 8 S's (segmented substreams from the original information data), we will need all 8 Y's (stored data files). For applications where privacy is not critical in a stored data set, we may use all the input files, the 8 S's (segmented substreams from an original information data), as the primary storage files while the redundancy or parity files may be selected from the 8 Y's.

It is noticed that each output in the equations is a linear combination of 4 of the 8 S's only. More specifically as indicated in FIG. 14A, Equation (12a-1) and (12c-1) aggregate 4 inputs of pixel streams together via two linear combinations, respectively, of the real parts of the 4 complex inputs 1302. Equation (12a-2) and (12c-2), respectively via the two linear combinations, depict the processing of combining 4 pixel streams of the imaginary parts of the 4 complex inputs 1302. The other 4 equations 12b-1 12b-2, 12d-1 and 12d-2 show the 4 respective linear combinations of 4 pixel streams related to the real parts of 2 complex inputs 1302 and the imaginary parts of the other 2 remaining complex inputs 1302.

In many other embodiments, the 8 segmented inputs (S01 to S32) will be used as storage data sets, and the 8 outputs (Y1r to Y4q) as redundancy or as parity files. The 8 inputs 1302 may be data sub-files segmented from a single large file, 8 independent files, combinations of multiple (N) sub-files from a first large file and multiple (8-N) sub-files from a second large file, or combinations of multiple (N) sub-files from a third large file and multiple (8-N) other independent files. The process of utilizing the polynomial 128 in FIG. 14 will provide 8 additional parity files, in which we may choose 2 only for some applications which support a 1.25× total storage but with limited survivability protection. For other applications with enhanced survivability which need a 2× storage, we may take all 8 outputs as a set of parity files.

In short the K-muxing 130 features 4 inputs 1302 and 4 outputs 1304. These inputs and outputs are complex data streams, each of which can be re-written as two real pixel substreams. Therefore, the K-muxing 130 effectively performs a transformation with 8-real inputs and 8-real outputs.

FIG. 14B depicts a configuration nearly identical to that shown in FIG. 14 except one of inputs to the K-muxing 130 is grounded. Both parts of S0 inputs, S01 and S02, are set to zero. We keep the polynomial 128 the same as that in FIG. 14 and operated in the domain only of X=[X1, X2, X3, X4], where X1=1, X2=j, X3=−1, and X4=−j. The three remaining inputs, S1 106a, S2 106b and S3 106c, are segmented separately into [S11, S12], [S21, S22], [S31, S32], respectively. The 4 complex inputs to the K-Muxing 130 are formulated pixel-by-pixel or sample-by-sample in the pixel streams according to equation (10-1) to (10-4). More specifically in a format of sample-by-sample in the pixel streams for the 4 inputs, A1=S1=S11+j S12, A2=S2=S21+jS22, A3=S3=S31+jS32, and A4=S0=0.

Under these conditions, equations (12a-1) to (12d-2) become $$Y1r = S11 + S21 + S31 \quad (12\text{a-}10)$$

$$Y1q = S12 + S22 + S32 \quad (12\text{a-}20)$$

$$Y2r = -S12 - S21 + S32 \quad (12\text{b-}10)$$

$$Y2q = S11 - S22 - S31 \quad (12\text{b-}20)$$

$$Y3r = -S11 + S21 - S31 \quad (12\text{c-}10)$$

$$Y3q = -S12 + S22 - S32 \quad (12\text{c-}20)$$

$$Y4r = S12 - S21 - S32 \quad (12\text{d-}10)$$

$$Y4q = -S11 - S22 + S31 \quad (12\text{d-}20)$$

There are total 6 inputs (segmented inputs from 3 pictures) but with 8 outputs via 8 equations. It is certain that the 8 outputs are not independent. There may be as many as 2 redundant equations for operation using input formats in sample-by-sample in the pixel streams. In reconstructing S1 to S3, there are 6 unknown (S11 to S32) with 8 equations relating 8 Y's (stored data files) and 6 S's (segmented substreams from 3 original photo data). There are two redundancy in FIG. 14B for the stored data while using conventional K-muxing methods featuring both data privacy and redundancy. In order to reconstruct the 6 S's (segmented substreams from the 3 original photos), we will need any 6 from all 8 Y's (stored data files). For applications where privacy is not critical in a stored data set, we may use all the input files, the 6 S's (segmented substreams from an original information data), as the primary storage files while the redundancy or parity files may be selected from the 8 Y's.

FIG. 14C depicts a configuration also nearly identical to that shown in FIG. 14 except one of inputs to the K-muxing 130 is a known digital file for authentication, diagnostic or/and an excess key. One of the two parts of S0 inputs, S01 and S02, is set to zero; S0=[C0, 0]. We keep the polynomial 128 the same as that in FIG. 14 and operated in the domain only of X=[X1, X2, X3, X4], where X1=1, X2=j, X3=−1, and X4=−j. The three remaining inputs, S1 106a, S2 106b and S3 106c, are segmented separately into [S11, S12], [S21, S22], [S31, S32], respectively. The 4 complex inputs to the K-Muxing 130 are formulated pixel-by-pixel or sample-by-sample in the pixel streams according to equation (10-1) to (10-4). More specifically in a format of sample-by-sample in the pixel streams for the 4 inputs, A1=S1=S11+j S12, A2=S2=S21+jS22, A3=S3=S31+jS32, and A4=S0=C0.

Under these conditions, equations (12a-1) to (12d-2) become $$Y1r = C0 + S11 + S21 + S31 \quad (12a\text{-}11)$$

$$Y1q = 0 + S12 + S22 + S32 \quad (12a\text{-}21)$$

$$Y2r = C0 - S12 - S21 + S32 \quad (12b\text{-}11)$$

$$Y2q = 0 + S11 - S22 - S31 \quad (12b\text{-}21)$$

$$Y3r = C0 - S11 + S21 - S31 \quad (12c\text{-}11)$$

$$Y3q = 0 - S12 + S22 - S32 \quad (12c\text{-}21)$$

$$Y4r = C0 + S12 - S21 - S32 \quad (12d\text{-}11)$$

$$Y4q = 0 - S11 - S22 + S31 \quad (12d\text{-}21)$$

There are total 7 inputs (segmented inputs from 3 pictures) but with 8 outputs via 8 equations. It is certain that the 8 outputs are not independent. There may be a redundant equation for operation using input formats in sample-by-sample in the pixel streams. In reconstructing S1 to S3 to a user community where C0 is known to them, there are 6 unknown (S11 to S32) with 8 equations relating 8 Y's (stored data files) and 6 S's (segmented substreams from 3 original photo data). There are two redundancy in FIG. 14C for the stored data while using conventional K-muxing methods featuring both data privacy and redundancy. In order to reconstruct the 6 S's (segmented substreams from the 3 original photos), we will need any 6 from all 8 Y's (stored data files).

On the other hand in reconstructing S1 to S3 to a user community where C0 is not known to them, there are 7 unknown (C0 and S11 to S32) with 8 equations relating 8 Y's (stored data files) and C0 as well as 6 S's (segmented substreams from 3 original photo data). There is one redundancy in FIG. 14C for the stored data while using conventional K-muxing methods featuring both data privacy and redundancy. In order to reconstruct the 6 S's (segmented substreams from 3 original photos), we will need any 7 from all 8 Y's (stored data files).

In some scenarios where only 6 of the stored Ys are available in reconstructing S1 to S3 to a user community where C0 is known to them, there are 6 unknown (S11 to S32) with 6 equations relating 6 available Y's (stored data files) to 6 S's (segmented substreams from 3 original photo data). The 6 S's can then be reconstructed.

For applications where privacy is not critical in a stored data set, we may use all the input files, the 6 S's (segmented substreams from an original information data), as the primary storage files while the redundancy or parity files may be selected from the 8 Y's.

FIG. 14D depicts a configuration also nearly identical to that shown in FIG. 14 except all inputs in complex number formats to the K-muxing 130 are connected to digital streams representing "real" numbers. The imaginary parts of the inputs are set to zeros; so that S=[S1, 0], S2=[S2, 0], S3=[S3, 0], and S0=[S0, 0]. We keep the polynomial 128 the same as that in FIG. 14 and operated in the domain only of X=[X1, X2, X3, X4], where X1=1, X2=j, X3=−1,and X4=−j. The 4 inputs to the K-Muxing 130, S1 106*a*, S2 106*b* and S3 106*c*, S0 106*d* are formatted into 4 separated pixel streams, respectively. The 4 complex inputs are formulated pixel-by-pixel or sample-by-sample in the pixel streams according to equation (10-1) to (10-4). More specifically in a format of sample-by-sample in the pixel streams, the 4 inputs are set so that A1=S1, A2=S2, A3=S3, and A4=S0.

Under these conditions, equations (12a-1) to (12d-2) become $$Y1r = S0 + S1 + S2 + S3 \quad (12a\text{-}12)$$

$$Y1q = 0 + 0 + 0 + 0 = 0 \quad (12a\text{-}22)$$

$$Y2r = S0 - 0 - S2 + 0 \quad (12b\text{-}12)$$

$$Y2q = 0 + S1 - 0 - S3 \quad (12b\text{-}22)$$

$$Y3r = S0 - S1 + S2 - S3 \quad (12c\text{-}12)$$

$$Y3q = 0 - 0 + 0 - 0 = 0 \quad (12c\text{-}22)$$

$$Y4r = S0 + 0 - S2 - 0 \quad (12d\text{-}12)$$

$$Y4q = 0 - S1 - 0 + S3 \quad (12d\text{-}22)$$

There are total 4 inputs (real number inputs from 4 pictures) but with 8 outputs via 8 equations. Two of them, (12a-22) and (12c-22) are zeros, and another two pairs [(12b-12), (12b-22)] and [(12d-12), (12d-22) are identical. As a result, the remaining are 4 independent outputs. In reconstructing S1, S2, S3 and S0 to a user community where S0 is used as a file for diagnostic, authentications, or/and identification key and known to them, there are 3 unknown (S1 to S3) with 4 equations relating 4 Y's (stored data files) and 3 S's (streams from 3 original photo data). There is a redundancy in FIG. 14D for the stored data while using conventional K-muxing methods featuring both data privacy and redundancy. In order to reconstruct the 3 S's (segmented substreams from the 3 original photos), we will need any 3 from all 4 Y's (stored data files).

On the other hand in reconstructing S1 to S3 to a user community where SO is not known to them, there are 4 unknown (S0 and S1 to S3) with 4 equations relating 4 Y's (stored data files) to S0 as well as 3 S's (streams from 3 original photo data). There is no redundancy in FIG. 14D for the stored data while using conventional K-muxing methods featuring only data privacy.

In some scenarios where only 3 of the 4 stored Ys are available in reconstructing S1 to S3 to a user community where S0 is known to them, there are 3 unknown (S1 to S3) with 3 equations relating 3 available Y's (stored data files) to 3 S's (streams from 3 original photo data). The 3 S's can then be reconstructed.

For applications where privacy is not critical in a stored data set, we may use all the input files, the 4 S's (streams from an original information data), as the primary storage files while the redundancy or parity files may be selected from the 4Y's.

FFT, Butler Matrix and Array Radiation Patterns

The polynomial 128 back to FIG. 14 generating 4-to-4 FFT, the X variable is selected over a finite field of [X] on the unity circle in a complex plane; where the adjacent X-samples are spaced by a rotation of $\pi/2$. We shall examine the formulation in terms of radiation patterns of a 4-element array with a uniform element spacing of a half wavelength. The weighting parameters between the output [Y's] and the [A's] in the four linear Equations (11a) to (11d) are tabulated in Table 1, and the corresponding phases and phase progressions of the weighting parameters are in Table 2.

TABLE 1

| | | complex weighting parameters | | | |
|---|---|---|---|---|---|
| X | Y (X) | A0 | A1 | A2 | A3 |
| X1 = 1 | Y (1) | 1 | 1 | 1 | 1 |
| X2 = j | Y (j) | 1 | j | −1 | −j |
| X3 = −1 | Y (−1) | 1 | −1 | 1 | −1 |
| X4 = −j | Y (−j) | 1 | −j | −1 | j |

TABLE 2

| | | phases of weights (deg.) | | | | |
|---|---|---|---|---|---|---|
| X | Y (X) | A0 | A1 | A2 | A3 | Δϕ (deg) |
| X1 = 1 | Y (1) | 0 | 0 | 0 | 0 | 0 |
| X2 = j | Y (j) | 0 | 90 | 180 | 270 | 90 |
| X3 = −1 | Y (−1) | 0 | 180 | 360 | 180 | 180 |
| X4 = −j | Y (−j) | 0 | −90 | −180 | −270 | −90 |

For an array forming multiple beams, the corresponding geometries are shown in panel A of FIG. 15. The transmitting linear array features 4 radiating elements 1516 with a uniform spacing of half wavelength. The beam forming network 1522, implemented with functions of those of a 4-to-4 FFT, features 4 inputs 1512 and 4 outputs 1514. A first inputs is fed by a stream of data of Y(1). Similarly, a $2^{nd}$, a $3^{rd}$, and a $4^{th}$ inputs are , respectively connected to 3 other data streams indicated as Y(j), Y9-1), and Y(−j). These 4 streams of data are radiated concurrently from all 4 elements 1516 of the transmitting array.

The BFN 1522 is programmed or configured to generated four orthogonal wavefronts WFV0, WFV1, WFV2, and WFV3; where $$WFV0=[1, 1, 1, 1]^T, \quad (11\text{-}1)$$

$$WFV1=[1, j, -1, -j]^T, \quad (11\text{-}2)$$

$$WFV2=[1, -1, 1, -1]^T, \quad (11\text{-}3)$$

$$WFV3=[1, -j, -1, j]^T, \quad (11\text{-}4)$$

and

¼ WFV$i^T$×WFV$j$*=0 when i≠j

¼ WFV$i^T$×WFV$j$*=1 when i=j.

Their relative phases are tabulated in Table 2. Y(1) is riding the first wavefront WFV0 corresponding to a beam with a beam peak at the boresite or θ=0° indicated by the arrow direction of Y(1). We refer the direction of the beam peak as the pointing direction. The $2^{nd}$ beam and the $4^{th}$ beam generated by the BFN 1522 for the Y(j) and Y(−j) streams, respectively, feature a beam pointing direction at θ=30 degree and θ=−30 degree. The $3^{rd}$ beam generated by the BFN 1522 for the Y(−1) stream features two beam pointing directions at θ=90 degree and θ=−90 degree. In fact, the peak at θ=−90 degree is a grating lobe of the main beam at θ=90 degree. The simulated results array gain vs azimuthal angle θ for the four radiation patterns are depicted on panel B of FIG. 15. The vertical axis are relative radiated power levels of antenna gain in dB, and the horizontal axis shows azimuthal angles θ in degrees. Beam 1 for Y(1) data stream is pointed at the boresite, or θ=0°, beam 2 for Y(j) data stream is pointed at the direction of θ=−30° and beam 4 for Y(−j) data stream is pointed at the direction of θ=30°.

It is also indicated that beam 3 actually is pointed in both ±90° away from the boresite; the end-fire directions.

Furthermore the four beams feature unique orthogonal beam (OB) radiation patterns. Among the 4 OB beams, a peak of one beam is always at a direction which is aligned exactly with nulls of radiation patterns of other 3 OB beams. An OB beam features a radiation pattern with nulls in the directions always aligned with the peaks of other 3 OB beams. As an example, the OB beam for Y(1) or Beam 1 features a peak at θ=0° which is also in the direction of a null of all 3 other beams, Beam 2 for Y(j), Beam 3 for Y(−1), and Beam 4 for Y(−j).

For the data storage applications, data at the outputs of the BFN 1522, which are wavefront multiplexed or K-muxed, is stored over distributed storage. Data retrievals are via "propagation via space" performing wavefront demultiplexing or K-demuxing. The propagation via space will be in forms of s/w emulations.

For antenna engineers, it is common to refer the pointing directions in a UV coordinates. For a one-dimension scan linear array, various pointing directions may be shown in different values of u; where u=sin θ. When θ is set to [−90°, −30°, 0°, 30°, 90°], the corresponding u shall become [−1, −½, 0 , ½, 1]. The difference in the "u" coordinate for the beam pointing directions between adjacent scanned beams generated by the array with the BFN 1522, or Δu, is ½. Since the element spacing among the 4 elements 1516 of the array is set at a half wavelength, the grating lobes will appear at directions with Δu=2.The grating lobes for beams pointed at various direction, their respective grating lobes are in imaginary space. Only beams pointed near end-fired directions θ=±90° as Beam 3 in panel B of FIG. 15.

For an array forming multiple beams via Butler Matrixes, the corresponding geometries are shown in panel A of FIG. 16. The transmitting linear array features 4 radiating elements 1516 with a uniform spacing of half wavelength. The beam forming network 1522, implemented by a 4-to-4 Butler Matrix or programmed in s/w in a digital beam forming (DBF) network to function as a Butler matrix , features 4 inputs 1512 and 4 outputs 1514. A first inputs is fed by a stream of data of Y(1R). Similarly, a $2^{nd}$, a $3^{rd}$, and a $4^{th}$ inputs are, respectively connected to 3 other data streams indicated as Y(2R), Y(2L), and Y(1L). These 4 streams of data are radiated concurrently from all 4 elements 1516 of the transmitting array.

The corresponding far field radiation patterns are depicted in panel B of FIG. 16. The four beams feature OB radiation patterns; and 4 peaks at ±14.48°, and ±48.59°. The corresponding u shall become [−¾, −¼, ¼, ¾]. The spacing in u between the pointing directions of two adjacent beams or Δu, is also ½; identical to that among the 4 OB radiation patterns from the configuration in FIG. 15. In fact, the 4 OB radiation patterns in FIG. 15 and those in FIG. 16 shall be identical if an additional phase gradient of π/4 among the 4 element 1516 after the 4-to-4 FFT is implemented. As a result, the four OB beams shall be biased or rotated in pointing directions by a δu where δu=−¼. More specifically, Y(1) shall be pointed from the original direction u=0 to a new direction u=−¼or 0° to −14.48°. The beam pointing direction for Y(j) stream shall be rotated from u=−½(or −30° from the boresite) to u=−¾(or −48.59° from the boresite), and that for the beam pointing direction for Y(−1) stream shall be rotated from u=±1 (or ±90° from the boresite, or the end-fired directions) to u=¾(or 48.59° from the boresite). The beam pointing direction for Y(−j) stream shall be rotated from u=½(or 30° from the boresite) to u=¼(or 14.48° from the boresite), The OB pattern features among the 4 beams in the new pointing directions shall remain true.

On the other hand, Butler matrixes are linear devices. Therefore superposition principle is applicable for both the homogeneity and additivity properties. FIG. 16A depicts a functional diagram of a 4-to-4 Butler Matrix 1442, featuring 4 inputs 1402 and 4 outputs 1404. The 4 inputs are labeled as 1R, 2R, 2L and 1L; and the 4 outputs are A, B, C and D. The 4-to-4 Butler Matrix 1442 comprises of four 90° hybrids 1424 and two 45° fixed phase shifters 1426.

The 4 inputs 1402 can be connected to 4 independent data flows. A first input stream connected to the 1R port will appear in all 4 output ports [A,B, C, D] featuring a unique phase progression with a phase difference Δφ of −45° or −π/4 among adjacent ports. The unique phase progression is referred to a wavefront; mathematically expressed in similar forms of equations (11-1) to (11-4). Similarly a second input stream connected to the 2R port will appear in all 4 output ports [A,B, C, D] featuring a unique phase progression with a phase difference Δφ of −135° or −3π/4 among adjacent ports. A third input stream connected to the 2L port will appear in all 4 output ports [A,B, C, D] featuring a unique phase progression with a phase difference Δφ of 135° or 3π/4 among adjacent ports. A fourth input stream connected to the 1L port will appear in all 4 output ports [A,B, C, D] featuring a unique phase progression with a phase difference Δφ of 45° or π/4 among adjacent ports. The phase distributions of the outputs 1404 according to ports of the inputs 1402 are summarized in Table 3. Each input ports of the 4 inputs 1402 is associated with a unique wavefront. There are 4 wavefronts generated by the 4-to-4 Butler matrix, and they are orthogonal to one another.

TABLE 3

|    | A     | B      | C      | D      | Δφ    |
|----|-------|--------|--------|--------|-------|
| 1R | −π/4  | −π/2   | −3π/4  | −π     | −π/4  |
| 2R | −π/2  | −5π/4  | 0      | −3π/4  | −3π/4 |
| 2L | −3π/4 | 0      | −5π/4  | −π/2   | 3π/4  |
| 1L | −π    | −3π/4  | −π/2   | −π/4   | π/4   |

When we add a section of phase biasing 1428 in front the 4 inputs 1402 of the 4-to-4 Butler matrix 1442 as shown in FIG. 16B, the new phase distribution is depicted in Table-4. A phase reference, port A of the 4 outputs 1404, is used. However, the phase progressions or Δφ among the 4 outputs 1404 for each of the 4 inputs 1402 remain identical to those in Table-3.

TABLE 4

|    | A | B     | C      | D      | Δφ    |
|----|---|-------|--------|--------|-------|
| 1R | 1 | −π/4  | −2π/4  | −3π/4  | −π/4  |
| 2R | 1 | −3π/4 | π/2    | −π/4   | −3π/4 |
| 2L | 1 | 3π/4  | −2π/4  | π/4    | 3π/4  |
| 1L | 1 | π/4   | π/2    | 3π/4   | π/4   |

The pointing directions in FIG. 15 and those in FIG. 16 shall become identical if an additional phase gradient of π/4 among the 4 element 1516 after the 4-to-4 FFT in FIG. 15 is implemented. As a result, the four OB beams in FIG. 15 shall be biased or rotated in pointing directions by a δu where δu=−¼. More specifically, Y(1) shall be pointed from the original direction u=0 to a new direction u=−¼or 0° to −14.48°. The beam pointing direction for Y(j) stream shall be rotated from u=−½(or −30° from the boresite) to u=−¾ (or −48.59° from the boresite), and that for the beam pointing direction for Y(−1) stream shall be rotated from u=±1 (or ±90° from the boresite, or the end-fired directions) to u=¾(or 48.59° from the boresite).

In many other embodiments, the EC polynomial can be programmed to functions as other K-muxing transforms. FIG. 16C depict another example of using EC polynomial 128 for K-muxing function. It is a 4-to-4 K-muxing 130 with 4 real inputs 1302 and 4 real outputs 1304. The polynomial chosen is a two dimensional one; as written in Equation (14), and the 4 sampling points for four outputs are (1, 1), (1, −1), (−1, −1), and (−1, 1) in a XY plane $$Z(X, Y) = A_0 + A_1 X + A_2 Y + A_3 XY \tag{14}$$

or $$Z_1 = Z(1, 1) = A_0 + A_1 + A_2 + A_3 \tag{14-1}$$

$$Z_2 = Z(-1, 1) = A_0 - A_1 + A - A_3 \tag{14-2}$$

$$Z_3 = Z(-1, -1) = A_0 - A_1 - A_2 + A_3 \tag{14-3}$$

$$Z_4 = Z(1, -1) = A_0 + A_1 - A_2 - A_3 \tag{14-4}$$

These equations between the 4 inputs [As] and the 4 outputs [Z] can be written in a matrix form;

$$[Z] = [H] * [As] \tag{15}$$

where $$[Z] = [Z_1, Z_2, Z_3, Z_4]^T \tag{15a}$$

$$[As] = [A_0, A_1, A_2, A_3]^T \tag{15b}$$

$$[H] = \begin{bmatrix} 1 & 1 & 1 & 1 \\ 1 & -1 & 1 & -1 \\ 1 & -1 & -1 & 1 \\ 1 & 1 & -1 & -1 \end{bmatrix} \tag{15c}$$

[H] is a 4-to-4 Hadamard matrix

It is clear that the EC polynomial 128 can be programmed to functions as a Hadamard transform for K-muxing 130.

Cloud Storage of Medical Records via K-Muxing

FIG. 17 depicts the same block diagram as that of FIG. 14, except the inputs 1302 are connected to medical records 1060 of patients instead of digital photos. The medical record 1060 comprises of personal data and information associated with personal data. Storage via conventional K-muxing features privacy and redundancy. The medical record 1060 can be sorted out into multiple categories through a sorting process 1080. In this example, let us assume the medical records 1060 are sorted and grouped into 8 folders; from S11 1062A to S02 1068B. Two of them S11 1062A and S21 1064A are personal data. In addition, S31 1066A and S01 1068A may be key information associated to personal data. The remaining four files; S12 1062B, S22 1064B, S32 1066B, and S02 1068B belong to a category of public information.

FIG. 17 depicts a block diagram using a polynomial 128 for RS code, as a version k-muxing 130 among medical records. The polynomial 128 is sampled at multiple Xs on a unity circle in a complex X-plane, where the amplitudes of the sampled X's always equal to unity.

$$Y(X) = A_0 + A_1 X + A_2 X^2 + A_3 X^3 \tag{10}$$

where

The complex input $[A_0]$ comprising inputs for digital data of S01 1168A and S02 1168B which are converted as a stream S01+j S02, The complex input $[A_1]$ comprising inputs for digital data of S11 1162A and S12 1162B which are converted as a stream S11+j S12, The complex input $[A_2]$ comprising inputs for digital data of S21 1164A and S22 1164B which are converted as a stream S21+j S22, The complex input $[A_3]$ comprising inputs for digital data of S31 1166A and S32 1166B which are converted as a stream S31+j S32, $[A_1, A_1, A_2, A_3]$ are the 4 inputs 1302 of a K-muxing 130.

We shall program the polynomial 128 to function as 4-to-4 FFT. Corresponding 4 complex outputs 1304 of the K-muxing 130 comprise the following 8 aggregated real number data flows;

$$Y1r = S01 + S11 + S21 + S31 \quad (12a\text{-}1)$$

$$Y1q = S02 + S12 + S22 + S32 \quad (12a\text{-}2)$$

$$Y2r = S01 - S12 - S21 + S32 \quad (12b\text{-}1)$$

$$Y2q = S02 + S11 - S22 - S31 \quad (12b\text{-}2)$$

$$Y3r = S01 - S11 + S21 - S31 \quad (12c\text{-}1)$$

$$Y3q = S01 - S12 + S22 - S32 \quad (12c\text{-}2)$$

$$Y4r = S01 + S12 - S21 - S32 \quad (12d\text{-}1)$$

$$Y4q = S02 - S11 - S22 + S31 \quad (12d\text{-}2)$$

Assuming any one of the 8 real inputs is unavailable, we only need 4 stored files for local repairs.

What is claimed is:

1. An apparatus comprising:
an image sensor to obtain a visual object;
a buffer to store the obtained visual object; and
a pre-processor device having K input ports and K output ports, N of the K input ports being connected to input streams processed by a pre-processing application operating on the buffer, the K output ports providing output streams for transmission to a cloud storage site via a wireless interface,
wherein N and K are positive integers and N≤K, and
wherein the output streams are wavefront (WF) components of a WF muxing transform on the input streams such that the WF components are mutually orthogonal.

2. The apparatus of claim 1 wherein the pre-processor device comprises:
a segmentation processor to segment an original stream corresponding to the obtained visual object into the input streams; and
a WF device to convert the input streams into the output streams using an orthogonal matrix.

3. The apparatus of claim 1 further comprising:
a plurality of local buffers associated with applications related to synchronization management of cloud storage at the cloud storage site.

4. The apparatus of claim 1 wherein at least one of the K input ports is grounded or connected to a known stream.

5. The apparatus of claim 1 wherein the WF muxing transform is implemented by one of a Hadamard transform, a Fourier transform, and a full-rank matrix.

6. The apparatus of claim 1 wherein the WF muxing transform corresponds to an erasure coding transform.

7. The apparatus of claim 6 wherein the WF muxing transform corresponds to a polynomial of a Reed-Solomon code.

8. The apparatus of claim 6 wherein the input and output streams are complex data streams.

9. The apparatus of claim 1 wherein the visual object is an image or a video clip.

10. The apparatus of claim 6 wherein the visual object is a plurality of images or a plurality of video clips.

11. An apparatus comprising:
a wireless interface to connect to a wireless network to retrieve data streams representing a visual object from a cloud storage site;
a buffer to store the data streams; and
a post-processor device having K input ports and K output ports, the K input ports being connected to the buffer to receive the data streams processed by a post-processing application operating on the buffer, N of the K output ports providing output streams for displaying the visual object,
wherein N and K are positive integers and N≤K, and
wherein the output streams are wavefront (WF) components of a WF de-muxing transform on the data streams such that the WF components are mutually orthogonal.

12. The apparatus of claim 11 wherein the post-processor device comprises:
a WF de-muxing device to convert the data streams into the output streams using an inverse orthogonal matrix; and
a de-segmentation processor to de-segment the output streams into a reconstituted stream corresponding to the visual object.

13. The apparatus of claim 11 further comprising:
a plurality of local buffers associated with applications related to synchronization management of cloud storage at the cloud storage site.

14. The apparatus of claim 11 wherein at least one of the K input ports is grounded or left unused.

15. The apparatus of claim 11 wherein the WF de-muxing transform is implemented by an inverse of one of a Hadamard transform, a Fourier transform, and a full-rank matrix.

16. The apparatus of claim 11 wherein the WF de-muxing transform corresponds to an inverse erasure coding transform.

17. The apparatus of claim 11 wherein the WF de-muxing transform corresponds to an inverse of a polynomial of a Reed-Solomon code.

18. The apparatus of claim 11 wherein the data and output streams are complex data streams.

19. The apparatus of claim 1 wherein the visual object is an image or a video clip.

20. The apparatus of claim 6 wherein the visual object is a plurality of images or a plurality of video clips.

* * * * *